United States Patent
Krishnan et al.

(10) Patent No.: US 11,956,677 B2
(45) Date of Patent: Apr. 9, 2024

(54) QUALITY OF EXPERIENCE MEASUREMENT AND REPORTING

(71) Applicant: QUALCOMM Incorporated, San Diego, CA (US)

(72) Inventors: Shankar Krishnan, San Diego, CA (US); Xipeng Zhu, San Diego, CA (US); Rajeev Kumar, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/394,664

(22) Filed: Aug. 5, 2021

(65) Prior Publication Data

US 2022/0053380 A1    Feb. 17, 2022

Related U.S. Application Data

(60) Provisional application No. 63/064,815, filed on Aug. 12, 2020.

(51) Int. Cl.
*H04W 28/24* (2009.01)
*H04W 24/10* (2009.01)
*H04W 28/22* (2009.01)

(52) U.S. Cl.
CPC .......... *H04W 28/24* (2013.01); *H04W 24/10* (2013.01); *H04W 28/22* (2013.01)

(58) Field of Classification Search
CPC ...... H04W 28/24; H04W 24/10; H04W 28/22
See application file for complete search history.

(56) References Cited

U.S. PATENT DOCUMENTS

2013/0286868 A1* 10/2013 Oyman ............... H04L 41/5006 370/252
2013/0326551 A1* 12/2013 Chatterjee ......... H04W 28/0289 725/9

(Continued)

OTHER PUBLICATIONS

3GPP TSG-RAN WG3 #109-e R3-205360 Source: CATT Title: Discussion on NR QoE solution architecture and interface impact (Year: 2020).*

(Continued)

*Primary Examiner* — Chi H Pham
*Assistant Examiner* — Weibin Huang
(74) *Attorney, Agent, or Firm* — Holland & Hart LLP/Qualcomm Incorporated

(57) ABSTRACT

Methods, systems, and devices for wireless communications are described. A user equipment (UE) may measure quality of experience (QoE) metrics and transmit a QoE report that is formatted to be readable by a base station, such that a base station may receive the QoE report and independently perform adjustments associated with the service being utilized by the UE. A UE may receive a configuration message that includes a first configuration for reporting QoE measurements to a base station and a second configuration for reporting QoE measurements to a QoE server. The UE may measure one or more QoE metrics in accordance with the configuration message, and generate a first report for the base station based on the QoE measurements and the first configuration. Upon generating the report, the UE may transmit the first report to the base station in accordance with the first configuration.

27 Claims, 17 Drawing Sheets

(56) References Cited

U.S. PATENT DOCUMENTS

| | | | |
|---|---|---|---|
| 2020/0396631 A1* | 12/2020 | Han | H04W 28/0268 |
| 2022/0022228 A1* | 1/2022 | Wang | H04W 4/46 |
| 2022/0400370 A1* | 12/2022 | Yang | H04W 24/08 |
| 2022/0417780 A1* | 12/2022 | Liu | H04W 28/0268 |
| 2023/0108918 A1* | 4/2023 | Babaei | H04W 36/0085 |
| | | | 370/331 |

OTHER PUBLICATIONS

3GPP TSG-RAN WG3 #109-e, R3-205360 Aug. 17-28, 2020 Source: CATT Title: Discussion on NR QoE solution architecture and interface impact (Year: 2020).*

3GPP TR 38.890: "3rd Generation Partnership Project; Technical Specification Group Radio Access Network; Study on NR QoE (Quality of Experience) Management and Optimizations for Diverse Services (Release 17)", 3GPP Standard, Technical Report, 3GPP TR 38.890 V17.0.0 (Apr. 2012), 3rd Generation Partnership Project (3GPP), Mobile Competence Centre, 650, Route Des Lucioles, F-06921 Sophia-Antipolis Cedex, France, vol. RAN WG3, No. V17.0.0, Apr. 9, 2021 (Apr. 9, 2021), pp. 1-18, XP052000775, Retrieved from the Internet: URL:https://ftp.3gpp.org/Specs/archive/38_series/38.890/38890-h00.zip, 38890-h00.docx [retrieved on Apr. 9, 2021] Section 6.7.1 with Reference to Fig.7.1-1.

3GPP TS 26.247: "3rd Generation Partnership Project; Technical Specification Group Services and System Aspects; Transparent end-to-end Packet-Switched Streaming Service (PSS); Progressive Download and Dynamic Adaptive Streaming Over http (3GP-DASH) (Release16)", 3GPP Standard, Technical Specification, 3GPP TS 26.247, V16.3.0 (Jun. 2020), 3rd Generation Partnership Project (3GPP), Mobile Competence Centre, 650, Route Des Lucioles, F-06921 Sophia-Antipolis Cedex, France, vol. SA WG4. No. V16. 3.0, Jul. 17, 2020 (Jul. 17, 2020), pp. 1-140, XP051925259, Retrieved from the Internet: URL:ftp://ftp.3gpp.org/Specs/archive/26_series/26.247/26247-g30.zip, 26247-g30.doc [retrieved on Jul. 17, 2020] Whole section 10.

3GPP TS 36.331: "3rd Generation Partnership Project; Technical Specification Group Radio Access Network; Evolved Universal Terrestrial Radio Access (E-UTRA); Radio Resource Control (RRC); Protocol Specification (Release 16)", 3GPP Standard, Technical Specification, 3GPP TS 36.331, 3rd Generation Partnership Project (3GPP), Mobile Competence Centre, 650, Route Des Lucioles, F-06921 Sophia-Antipolis Cedex, France, vol. RAN WG2. No. V16.1.1, Jul. 26, 2020 (Jul. 26, 2020), pp. 1-1078, XP051925852, Retrieved from the Internet: URL:ftp://ftp.3gpp.org/Specs/archive/36_series/36.331/36331-g11.zip 36331-g11.docx [retrieved on Jul. 26, 2020] Whole section 5.6.19 and p. 380.

CATT: "Discussion on NR QoE Solution Architecture and Interface Impact", 3GPP Draft, R3-205360, 3GPP TSG-RAN WG3 #109-e, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 28, 2020, Aug. 7, 2020 (Aug. 7, 2020), XP051916026, 3 Pages, Retrieved from the Internet: URL:https://ftp.3gpp.org/tsg_ran/WG3_lu/TSGR3_109-e/Docs/R3-205360.zip, R3-205360 NR-QoE-Architec.doc [retrieved on Aug. 7, 2020] Sections 1-2.

International Search Report and Written Opinion—PCT/US2021/044914—ISA/EPO—dated Nov. 18, 2021.

Qualcomm Inc: "Support for RAN-Visible QoE", 3GPP Draft, R3-211736, 3GPP TSG-RAN WG3 Meeting #112e, 3rd Generation Partnership Project (3GPP), Mobile Competence Centre, 650, Route Des Lucioles, F-06921 Sophia-Antipolis Cedex, France, vol. RAN WG3. No. E- Meeting, May 17, 2021-May 27, 2021, May 7, 2021 (May 7, 2021), XP052002025, 9 Pages, Retrieved from the Internet: URL:https://ftp.3gpp.org/tsg_ran/WG3_lu/TSGR3_112-e/Docs/R3-211736.zip, R3-211736 RAN-visible QoE.docx [retrieved on May 7, 2021] Sections 2.1-2.2 with Reference to Fig. 1.

* cited by examiner

QUALITY OF EXPERIENCE MEASUREMENT AND REPORTING

CROSS REFERENCE

The present Application for Patent claims the benefit of U.S. Provisional Patent Application No. 63/064,815 by KRISHNAN et al., entitled "QUALITY OF EXPERIENCE MEASUREMENT AND REPORTING," filed Aug. 12, 2020, assigned to the assignee hereof, and expressly incorporated by reference herein.

FIELD OF TECHNOLOGY

The following relates to wireless communications, including quality of experience (QoE) measurement and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured with a quality of experience (QoE) measurement configuration that the UE may use to measure QoE metrics of a service being utilized by the UE and to report the QoE measurements to a base station. The base station may relay the QoE measurements to a QoE server. The QoE server may perform or indicate to the base station adjustments to make to parameters associated with the service to improve the QoE associated with that service. Conventional techniques for measuring and reporting QoE measurements may be improved.

SUMMARY

The described techniques relate to improved methods, systems, devices, and apparatuses that support quality of experience (QoE) measurement and reporting. Generally, the described techniques provide for a user equipment (UE) to measure QoE metrics and transmit a QoE report that is formatted to be readable by a base station (e.g., understandable to the base station, the base station may perform actions based on the QoE report), such that a base station may receive the QoE report and independently perform adjustments associated with the service being utilized by the UE. In some cases, the described techniques may provide for real-time QoE reporting between a UE, base station, and in some cases, a QoE server. Further, the described techniques may provide for QoE measurements to be readable by different types of units of a disaggregated base station (e.g., a base station with a central unit (CU) and distributed unit (DU) split). For example, a UE may receive a configuration message that includes a first configuration for reporting QoE measurements to a base station and a second configuration for reporting QoE measurements to a QoE server. The UE may measure one or more QoE metrics in accordance with the configuration message, and generate a first report for the base station based on the QoE measurements and the first configuration. Upon generating the report, the UE may transmit at least the first report to the base station in accordance with the first configuration.

A method of wireless communications at a UE is described. The method may include receiving a configuration message that includes a first configuration for reporting QoE measurements to a base station and a second configuration for reporting QoE measurements to a QoE server, measuring one or more QoE metrics in accordance with the configuration message, generating a first report for the base station based on the QoE measurements and the first configuration, and transmitting the first report to the base station in accordance with the first configuration, the first report including a set of QoE metrics that are formatted to be readable by the base station.

An apparatus for wireless communications is described. The apparatus may include a processor, memory coupled with the processor, and instructions stored in the memory. The instructions may be executable by the processor to cause the apparatus to receive a configuration message that includes a first configuration for reporting QoE measurements to a base station and a second configuration for reporting QoE measurements to a QoE server, measure one or more QoE metrics in accordance with the configuration message, generate a first report for the base station based on the QoE measurements and the first configuration, and transmit the first report to the base station in accordance with the first configuration, the first report including a set of QoE metrics that are formatted to be readable by the base station.

Another apparatus for wireless communications is described. The apparatus may include means for receiving a configuration message that includes a first configuration for reporting QoE measurements to a base station and a second configuration for reporting QoE measurements to a QoE server, measuring one or more QoE metrics in accordance with the configuration message, generating a first report for the base station based on the QoE measurements and the first configuration, and transmitting the first report to the base station in accordance with the first configuration, the first report including a set of QoE metrics that are formatted to be readable by the base station.

A non-transitory computer-readable medium storing code for wireless communications is described. The code may include instructions executable by a processor to receive a configuration message that includes a first configuration for reporting QoE measurements to a base station and a second configuration for reporting QoE measurements to a QoE server, measure one or more QoE metrics in accordance with the configuration message, generate a first report for the base station based on the QoE measurements and the first configuration, and transmit the first report to the base station in accordance with the first configuration, the first report including a set of QoE metrics that are formatted to be readable by the base station.

In some examples of the method, apparatuses, and non-transitory computer-readable medium described herein, transmitting the first report to the base station further may include operations, features, means, or instructions for transmitting the first report to a CU of the base station, the base station including the CU and one or more DUs.

In some examples of the method, apparatuses, and non-transitory computer-readable medium described herein, transmitting the first report to the CU of the base station may include operations, features, means, or instructions for transmitting the first report via an applications layer report in accordance with the first configuration.

In some examples of the method, apparatuses, and non-transitory computer-readable medium described herein, transmitting the first report to the base station further may include operations, features, means, or instructions for transmitting the first report to a DU of the base station, the base station including a CU and one or more DUs.

In some examples of the method, apparatuses, and non-transitory computer-readable medium described herein, transmitting the first report to the DU of the base station may include operations, features, means, or instructions for transmitting the first report via an uplink medium access control (MAC) control element (MAC-CE) in accordance with the first configuration.

In some examples of the method, apparatuses, and non-transitory computer-readable medium described herein, transmitting the first report to the base station further may include operations, features, means, or instructions for transmitting a set of QoE metrics that may be formatted to be readable by the base station.

In some examples of the method, apparatuses, and non-transitory computer-readable medium described herein, transmitting the set of QoE metrics may include operations, features, means, or instructions for transmitting an overall QoE satisfaction level metric as one of the set of QoE metrics, the overall QoE satisfaction level metric indicating a level of satisfaction associated with a service provided to the UE via the base station.

In some examples of the method, apparatuses, and non-transitory computer-readable medium described herein, transmitting the set of QoE metrics may include operations, features, means, or instructions for transmitting a bitrate satisfaction level metric as one of the set of QoE metrics, the bitrate satisfaction level indicating a level of satisfaction associated with a bitrate used for communications pertaining to a service provided to the UE via the base station.

In some examples of the method, apparatuses, and non-transitory computer-readable medium described herein, transmitting the set of QoE metrics may include operations, features, means, or instructions for transmitting a delay satisfaction level metric as one of the set of QoE metrics, the delay satisfaction level indicating a level of satisfaction associated with an experienced delay in communications pertaining to a service provided to the UE via the base station.

In some examples of the method, apparatuses, and non-transitory computer-readable medium described herein, transmitting the set of QoE metrics may include operations, features, means, or instructions for transmitting an error rate satisfaction level metric as one of the set of QoE metrics, the error rate satisfaction level indicating a level of satisfaction associated with a packet error rate (PER) used for communications pertaining to a service provided to the UE via the base station.

In some examples of the method, apparatuses, and non-transitory computer-readable medium described herein, transmitting the set of QoE metrics may include operations, features, means, or instructions for transmitting, as one of the set of QoE metrics, an indication of an average throughput associated with communications pertaining to a service provided to the UE via the base station, an indication of a retransmission probability for the communications pertaining to the service, a standard deviation associated with the communications pertaining to the service, or a combination thereof.

In some examples of the method, apparatuses, and non-transitory computer-readable medium described herein, transmitting the set of QoE metrics may include operations, features, means, or instructions for transmitting, as one of the set of QoE metrics, an indication of an average hypertext transmission protocol (HTTP) response time associated with communications pertaining to a service provided to the UE via the base station, a connection setup time for the communications pertaining to the service, or a combination thereof.

In some examples of the method, apparatuses, and non-transitory computer-readable medium described herein, the first report includes a type of service provided to the UE via the base station and with which the one or more QoE measurements may be associated.

In some examples of the method, apparatuses, and non-transitory computer-readable medium described herein, the first report includes a real time QoE report indicating the one or more QoE measurements.

In some examples of the method, apparatuses, and non-transitory computer-readable medium described herein, the configuration message may be received from a CU of the base station.

In some examples of the method, apparatuses, and non-transitory computer-readable medium described herein, the configuration message includes a type of service with which the QoE measurements may be associated.

Some examples of the method, apparatuses, and non-transitory computer-readable medium described herein may further include operations, features, means, or instructions for generating a second report for the QoE server based on the QoE measurements and the second configuration, and transmitting the second report to the QoE server via the base station.

A method of wireless communications at a base station is described. The method may include transmitting, to a UE, a configuration message that includes a first configuration for reporting QoE measurements to the base station and a second configuration for reporting QoE measurements to a QoE server, receiving, from the UE, a first report in accordance with the first configuration, the first report including a set of QoE metrics and a set of QoE measurements, where the set of QoE metrics are formatted to be readable by the base station, and determining, based on the set of QoE measurements included in the first report, whether to adjust one or more parameters for communicating with the UE in association with a service provided to the UE, where the set of quality of service measurements relate to the service.

An apparatus for wireless communications is described. The apparatus may include a processor, memory coupled with the processor, and instructions stored in the memory. The instructions may be executable by the processor to cause the apparatus to transmit, to a UE, a configuration message that includes a first configuration for reporting QoE measurements to a base station and a second configuration for reporting QoE measurements to a QoE server, receive, from the UE, a first report in accordance with the first configuration, the first report including a set of QoE metrics and a set of QoE measurements, where the set of QoE metrics are formatted to be readable by the base station, and determine, based on the set of QoE measurements included in the first report, whether to adjust one or more parameters for communicating with the UE in association with a service provided to the UE, where the set of quality of service measurements relate to the service.

Another apparatus for wireless communications is described. The apparatus may include means for transmitting, to a UE, a configuration message that includes a first configuration for reporting QoE measurements to a base station and a second configuration for reporting QoE measurements to a QoE server, receiving, from the UE, a first report in accordance with the first configuration, the first report including a set of QoE metrics and a set of QoE measurements, where the set of QoE metrics are formatted to be readable by the base station, and determining, based on the set of QoE measurements included in the first report, whether to adjust one or more parameters for communicating with the UE in association with a service provided to the UE, where the set of quality of service measurements relate to the service.

A non-transitory computer-readable medium storing code for wireless communications is described. The code may include instructions executable by a processor to transmit, to a UE, a configuration message that includes a first configuration for reporting QoE measurements to a base station and a second configuration for reporting QoE measurements to a QoE server, receive, from the UE, a first report in accordance with the first configuration, the first report including a set of QoE metrics and a set of QoE measurements, where the set of QoE metrics are formatted to be readable by the base station, and determine, based on the set of QoE measurements included in the first report, whether to adjust one or more parameters for communicating with the UE in association with a service provided to the UE, where the set of quality of service measurements relate to the service.

In some examples of the method, apparatuses, and non-transitory computer-readable medium described herein, receiving the first report from the UE further may include operations, features, means, or instructions for receiving the first report at a CU of the base station, the base station including the CU and one or more DUs.

In some examples of the method, apparatuses, and non-transitory computer-readable medium described herein, receiving the first report at the CU of the base station may include operations, features, means, or instructions for receiving the first report via an applications layer report in accordance with the first configuration.

Some examples of the method, apparatuses, and non-transitory computer-readable medium described herein may further include operations, features, means, or instructions for transmitting, to a DU of the base station, a third report including at least a portion of the QoE measurements included in the first report.

In some examples of the method, apparatuses, and non-transitory computer-readable medium described herein, the third report includes a set of QoE metrics that may be formatted to be readable by the base station and a type of service provided to the UE via the base station and with which the one or more QoE measurements may be associated.

In some examples of the method, apparatuses, and non-transitory computer-readable medium described herein, the CU of the base station transmits the third report to the DU of the base station via an F1 application protocol interface or via a UE Context Setup or Modification procedure.

In some examples of the method, apparatuses, and non-transitory computer-readable medium described herein, the third report may be a non-real time report.

In some examples of the method, apparatuses, and non-transitory computer-readable medium described herein, receiving the first report from the UE further may include operations, features, means, or instructions for receiving the first report at a DU of the base station, the base station including a CU and one or more DUs.

In some examples of the method, apparatuses, and non-transitory computer-readable medium described herein, receiving the first report at the DU of the base station may include operations, features, means, or instructions for receiving the first report via an uplink MAC-CE in accordance with the first configuration.

Some examples of the method, apparatuses, and non-transitory computer-readable medium described herein may further include operations, features, means, or instructions for transmitting, to the CU of the base station, a third report including at least a portion of the QoE measurements included in the first report.

In some examples of the method, apparatuses, and non-transitory computer-readable medium described herein, the third report includes a real-time QoE report received at the DU from the UE.

In some examples of the method, apparatuses, and non-transitory computer-readable medium described herein, the DU of the base station transmits the third report to the CU of the base station via an F1 application protocol interface.

In some examples of the method, apparatuses, and non-transitory computer-readable medium described herein, the CU includes a CU user plane (CU-UP) and a CU control plane (CU-CP), where the CU control plane receives the third report from the DU and forwards the third report to the CU user plane via an E1 application protocol interface using a bearer context setup or modification procedure.

In some examples of the method, apparatuses, and non-transitory computer-readable medium described herein, receiving the first report from the UE further may include operations, features, means, or instructions for receiving a set of QoE metrics that may be formatted to be readable by the base station.

In some examples of the method, apparatuses, and non-transitory computer-readable medium described herein, receiving the set of QoE metrics may include operations, features, means, or instructions for receiving an overall QoE satisfaction level metric as one of the set of QoE metrics, the overall QoE satisfaction level metric indicating a level of satisfaction associated with a service provided to the UE via the base station.

In some examples of the method, apparatuses, and non-transitory computer-readable medium described herein, receiving the set of QoE metrics may include operations, features, means, or instructions for receiving a bitrate satisfaction level metric as one of the set of QoE metrics, the bitrate satisfaction level metric indicating a level of satisfaction associated with a bitrate used for communications pertaining to a service provided to the UE via the base station.

In some examples of the method, apparatuses, and non-transitory computer-readable medium described herein, receiving the set of QoE metrics may include operations, features, means, or instructions for receiving a delay satisfaction level metric as one of the set of QoE metrics, the delay satisfaction level metric indicating a level of satisfaction associated with an experienced delay in communications pertaining to a service provided to the UE via the base station.

In some examples of the method, apparatuses, and non-transitory computer-readable medium described herein, receiving the set of QoE metrics may include operations, features, means, or instructions for receiving an error rate satisfaction level metric as one of the set of QoE metrics, the error rate satisfaction level metric indicating a level of satisfaction associated with a PER used for communications pertaining to a service provided to the UE via the base station.

In some examples of the method, apparatuses, and non-transitory computer-readable medium described herein, receiving the set of QoE metrics may include operations, features, means, or instructions for receiving, as one of the set of QoE metrics, an indication of an average throughput associated with communications pertaining to a service provided to the UE via the base station, an indication of a retransmission probability for the communications pertaining to the service, a standard deviation associated with the communications pertaining to the service, or a combination thereof.

In some examples of the method, apparatuses, and non-transitory computer-readable medium described herein, receiving the set of QoE metrics may include operations, features, means, or instructions for receiving, as one of the set of QoE metrics, an indication of an average HTTP response time associated with communications pertaining to a service provided to the UE via the base station, a connection setup time for the communications pertaining to the service, or a combination thereof.

In some examples of the method, apparatuses, and non-transitory computer-readable medium described herein, the first report includes a type of service provided to the UE via the base station and with which the one or more QoE measurements may be associated.

In some examples of the method, apparatuses, and non-transitory computer-readable medium described herein, the first report includes a real time QoE report indicating the one or more QoE measurements.

In some examples of the method, apparatuses, and non-transitory computer-readable medium described herein, the configuration message may be transmitted from a CU of the base station.

In some examples of the method, apparatuses, and non-transitory computer-readable medium described herein, the configuration message includes a type of service with which the QoE measurements may be associated.

Some examples of the method, apparatuses, and non-transitory computer-readable medium described herein may further include operations, features, means, or instructions for receiving, from the UE, a second report in accordance with the second configuration, where the intended recipient of the second report may be the QoE server, and relaying the second report to the QoE server.

DETAILED DESCRIPTION

Figure 1:
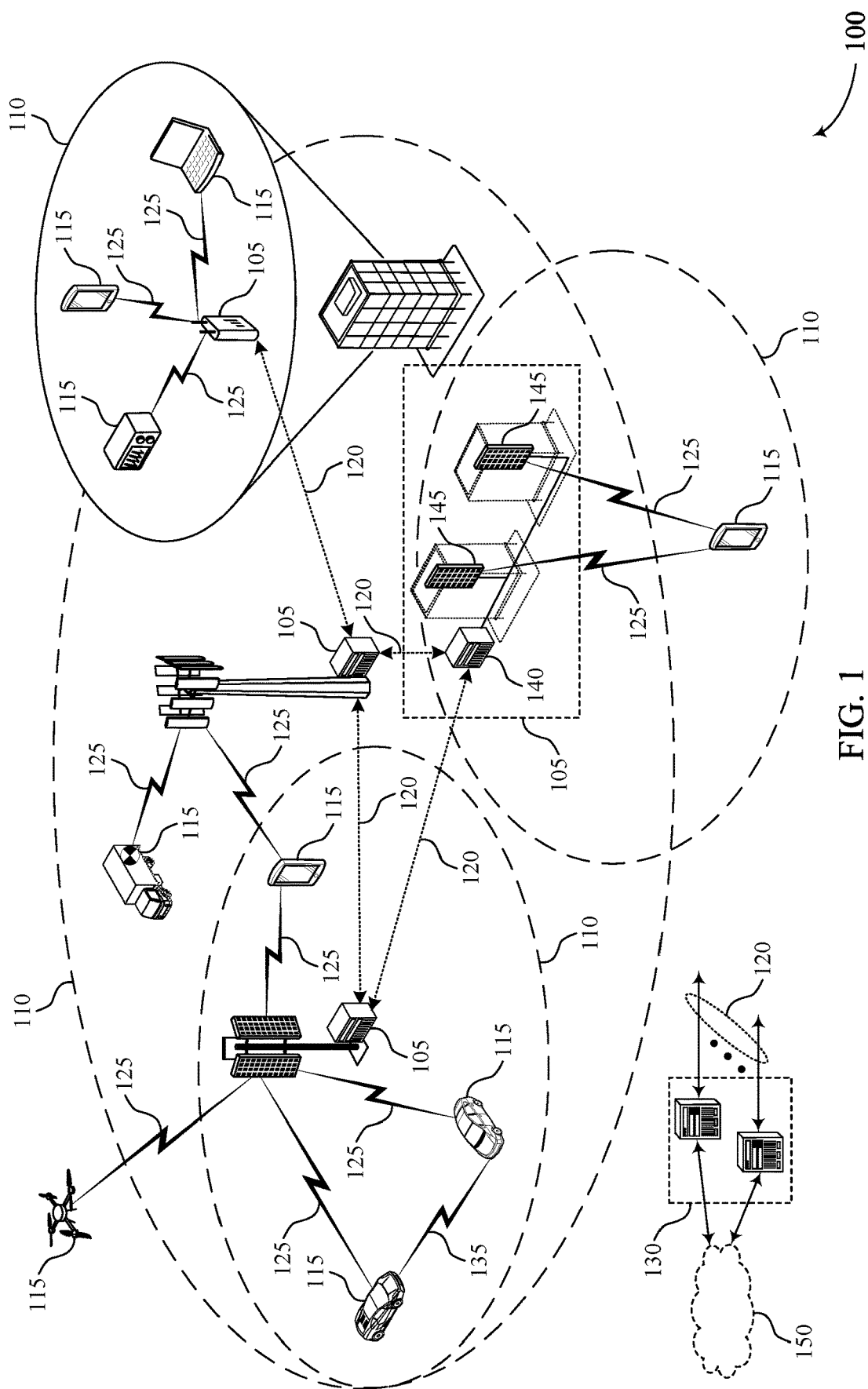
FIG. 1 illustrates an example of a system for wireless communications that supports quality of experience (QoE) measurement and reporting in accordance with aspects of the present disclosure.

In some wireless communications systems, a user equipment (UE) may be configured to measure quality of experience (QoE) metrics and report the QoE measurements to a base station, where the base station may relay the QoE measurements to a QoE server. The QoE measurements may indicate how the UE is experiencing an application served by the base station, such as a streaming application, chat application, video application, etc. Based on the QoE measurements, the QoE server may determine whether adjustments associated with providing the application should be made by the QoE server, or the base station, or both, to improve the quality the UE experiences while using the application. In conventional QoE measurement and reporting, the QoE report the UE may transmit to the base station may be in a configuration that is un-readable by the base station. As such, the base station must relay the QoE report the QoE server and wait for instructions from the QoE server on adjustments to make to optimize the QoE associated with an application. Further, QoE measurement and reporting may not be supported by a disaggregated base station (e.g., a base station split into a central unit (CU) and at least one distributed unit (DU)), which may adversely impact the ability of a CU or DU to optimize functionality of the CU, or DU, respectively. For example, a DU may not be able to perform medium access control (MAC) scheduling, beam management, etc. based on QoE reporting and optimize application performance based on radio conditions. Additionally, as current QoE configuration and reporting is radio resource control (RRC) based, only non-real-time QoE optimizations may be possible. These conventional techniques for QoE measurement and reporting may adversely impact the reliability and efficiency of the network because optimization opportunities are limited.

To improve network performance, throughput, and reliability, a base station-readable (e.g., RAN-aware) QoE report may be configured by a UE, where a base station-readable QoE configuration that defines the parameters for measuring and reporting the base station-readable QoE report may be configured by a base station (e.g., an aggregated base station, or by a unit of a disaggregated base station such as a CU or DU). As such, the UE may receive a configuration message that includes multiple configurations, such as a base station-readable QoE configuration and a QoE server configuration. The UE may measure QoE metrics and configure two reports, one intended for the base station, and one intended for the QoE server. The two reports may indicate the same or similar information, or different information associated with the QoE measurements and may be configured into a single message the UE may transmit to the base station. In some cases, the UE may transmit the two reports separately.

In some implementations, such as when the UE is connected to a disaggregated base station, the UE may transmit the QoE server report, or the base station-readable QoE report, or both to the CU of the base station. The CU may relay at least the base station-readable QoE report, or a similar report, to the DU of the base station. In some implementations, the UE may transmit at least the base station-readable QoE report to the DU of the base station, and the DU may relay the base station-readable QoE report, or a similar report, to the CU of the base station. In some cases, the base station-readable QoE report the UE may transmit to the DU, or the report the DU may transmit to the CU, or both may be real-time reports. For example, the base station-readable report may be transmitted to the DU via a MAC-CE. As such, separate units of a disaggregated base station may determine and perform adjustments associated with functionalities of the unit to support improved QoE at the UE without waiting for instructions from the QoE server or another unit.

Particular aspects of the subject matter described herein may be implemented to realize one or more advantages. The described techniques may support improvements in QoE measurement and reporting by improving flexibility in the network, improving reliability, and decreasing latency among other advantages. As such, supported techniques may include improved network operations and, in some examples, may promote network efficiencies, among other benefits.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to QoE measurement and reporting.

FIG. 1 illustrates an example of a wireless communications system 100 that supports QoE measurement and reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

To support improved network performance, throughput, and reliability, a UE 115 may be configured to measure QoE metrics and transmit a QoE report that is formatted to be readable by a base station 105, such that a base station 105 may receive the QoE report and independently perform adjustments associated with the service being utilized by the UE 115. In some cases, the described techniques may provide for real-time QoE reporting between a UE 115, a base station 105, and in some cases a QoE server. Further, the described techniques may provide for QoE measurements to be readable by different types of units of a disaggregated base station (e.g., a base station with CU-DU split). For example, a UE 115 may receive a configuration message that includes a first configuration for reporting QoE measurements to a base station 105 and a second configuration for reporting QoE measurements to a QoE server. The UE 115 may measure one or more QoE metrics in accordance with the configuration message, and generate a first report for the base station 105 (or a unit of the base station 105) based on the QoE measurements and the first configuration. Upon generating the report, the UE 115 may transmit the first report to the base station 105 in accordance with the first configuration.

Figure 2:
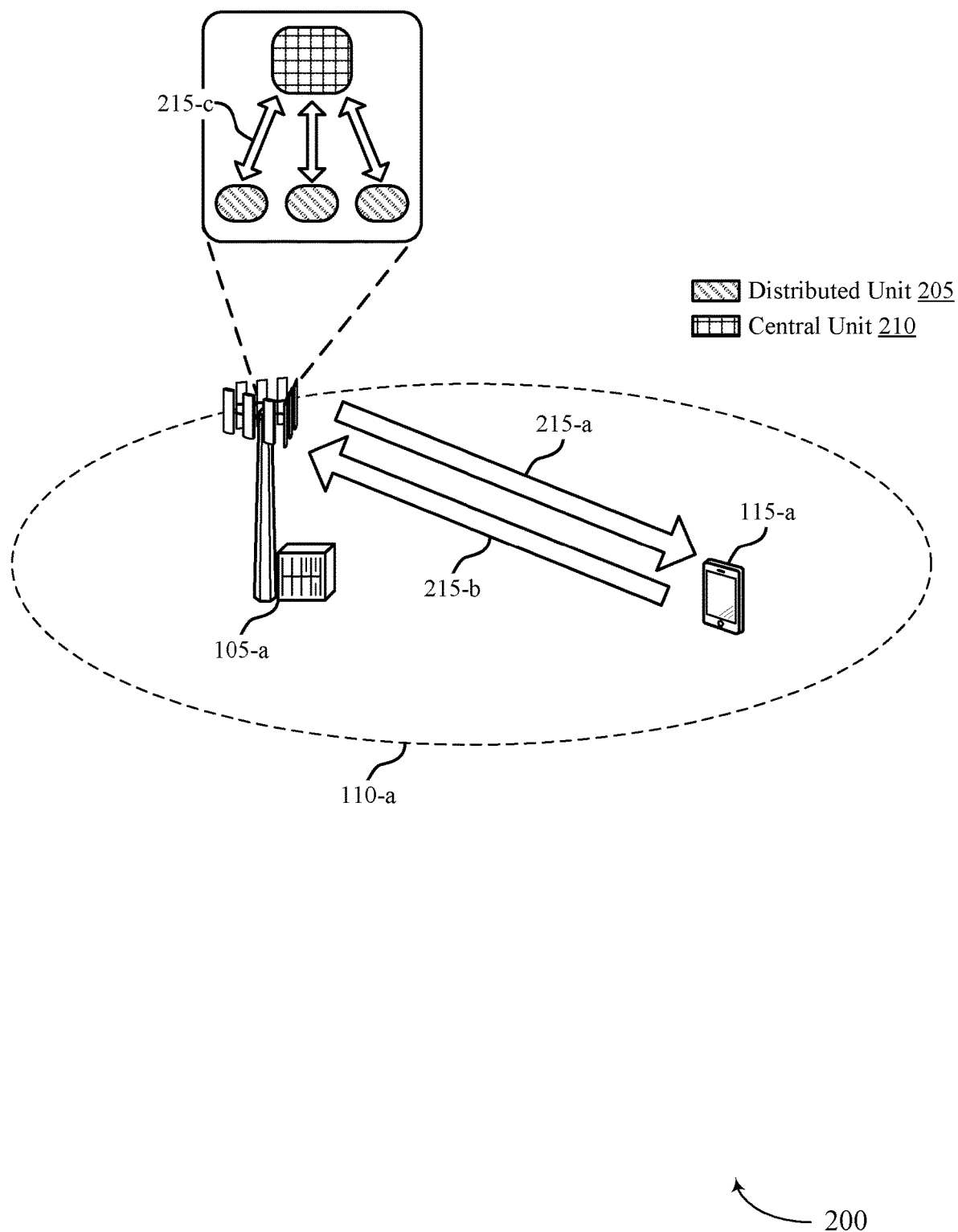
FIG. 2 illustrates an example of a system for wireless communications that supports QoE measurement and reporting in accordance with aspects of the present disclosure.

FIG. 2 illustrates an example of a wireless communications system 200 that supports QoE measurement and reporting in accordance with aspects of the present disclosure. The wireless communications system 200 may include base station 105-a and UE 115-a, which may be examples of a base station 105 and UEs 115 as described with reference to FIG. 1. Base station 105-a may serve a geographic coverage area 110-a. In some cases, UE 115-a may be configured to perform a QoE measurement and reporting procedure. Additionally or alternatively, other wireless devices, such as base station 105-a may implement a same or similar QoE measurement and reporting procedure.

In some cases, UE 115-a may communicate with base station 105-a via communication links, where base station 105-a may support the use of an application (e.g., video application, streaming application, chat application, voice application) by UE 115-a. For example, UE 115-a may transmit uplink signals to base station 105-a via communication link 215-b and base station 105-a may transmit downlink signals to UE 115-a via communication link 215-a, such as uplink signals, or downlink signals, or both associated with an application. In some cases, base station 105-a may be a disaggregated base station 105 such that base station 105-a is split into separate units. Base station 105-a may include a CU 210, and one or more DUs 205. In some cases, the CU 210 may communicate with the one or more DUs 205 via a communication link 215, such as communication link 215-c. In the case of a disaggregated base station 105, UE 115-a may communicate directly with a CU 210 of base station 105-a, or a DU 205 of base station 105-a, or both via communication links 215-a and 215-b.

In some implementations, UE 115-a may utilize an application served by base station 105-a. While utilizing the application, UE 115-a may be configured to measure QoE metrics such as throughput, error rate, etc. and to report the QoE measurements that are associated with the application to base station 105-a that is serving the application. Base station 105-a may relay the QoE measurements to a QoE server and the QoE server may adjust one or more parameters associated with application to improve application performance based on the QoE measurements. In some cases, the QoE server may relay one or more adjustments for base station 105-a to make to traffic parameters associated with serving the application so as to improve the QoE.

For example, a UE 115-a may be configured to measure the QoE metrics via a QoE measurement configuration message that UE 115-a may receive from base station 105-a over communication link 215-a. In some cases, base station 105-a may have received the QoE measurement configuration message from a QoE server. For example, upon receiving a QoE configuration from the QoE server, base station 105-a may relay the QoE configuration to UE 115-a via an RRC message, such as an RRC reconfiguration message, while the UE 115 is in an RRC connected mode with base station 105-a. Base station 105-a may include the QoE configuration in a field associated with the application layer (e.g., measConfigAppLayer), where the measConfigAppLayer field of the RRC reconfiguration message may include the QoE configuration and the type of service the QoE configuration is associated with. UE 115-a may measure the QoE metrics and report the QoE measurements, to base station 105-a, in a message associated with the application layer (e.g., measReportAppLayer), where the measReportAppLayer message may include the QoE report and an indication of the service type the QoE report is associated with. In conventional communications systems, in response to receiving the measReportAppLayer message, base station 105-a may relay the QoE report within the measReportAppLayer message to the QoE server and wait to perform adjustments to traffic parameters associated with the application until receiving instructions from the QoE server. As such, reliability, performance, and efficiency associated with QoE optimization may suffer.

To improve the quality and performance of applications being used by a UE 115, the QoE procedure may be improved to allow a UE 115 to configure base station-readable measurement reports associated with QoE. The parameters of the base station-readable measurement report may be defined by a base station-readable QoE configuration that may be transmitted by base station 105-a (or a unit of the base station such as a CU 210 or DU 205) to UE 115-a prior to UE 115-a configuring the base station-readable measurement report. For example, UE 115-a may receive, from base station 105-a via communication link 215-a, a configuration message that includes multiple configurations, such as a base station-readable QoE configuration and a QoE server configuration. The QoE server configuration may be utilized by UE 115-a to generate a QoE report for the QoE server that may be un-readable by base station 105-a. UE 115-a may measure QoE metrics associated with a service UE 115-a is utilizing and in accordance with the received configurations and UE 115-a may configure two reports, one intended for base station 105-a, and one intended for the QoE server. The two reports may indicate the same or similar information, or different information associated with the QoE measurements and may be configured into a single message UE 115-a may transmit to base station 105-a (or to a unit of the base station such as a CU 210 or DU 205) via communication link 215-b. In some cases, UE 115-a may transmit the two reports separately to base station 105-a.

In some cases, such as when UE 115-a is connected to a disaggregated base station (such as base station 105-a), UE 115-a may transmit the QoE server report, or the base station-readable QoE report, or both to the CU 210 of base station 105-a. The CU 210 may relay at least the base station-readable QoE report to the DU 205 of base station 105-a via communication link 215-c. In some cases, UE 115-a may transmit at least the base station-readable QoE report to the DU 205, and the DU 205 may relay the base station-readable QoE report to the CU 210. In some implementations, the base station-readable QoE report that UE 115-a may transmit to the DU 205, or the report the DU 205 may transmit to the CU, or both may be real-time reports. For example, the base station-readable report may be transmitted to the DU 205 via a MAC-CE. As such, separate units of a disaggregated base station 105 may determine and perform adjustments associated with functionalities of the unit to support improved QoE at UE 115-a without waiting for instructions from the QoE server or another unit.

Figure 3:
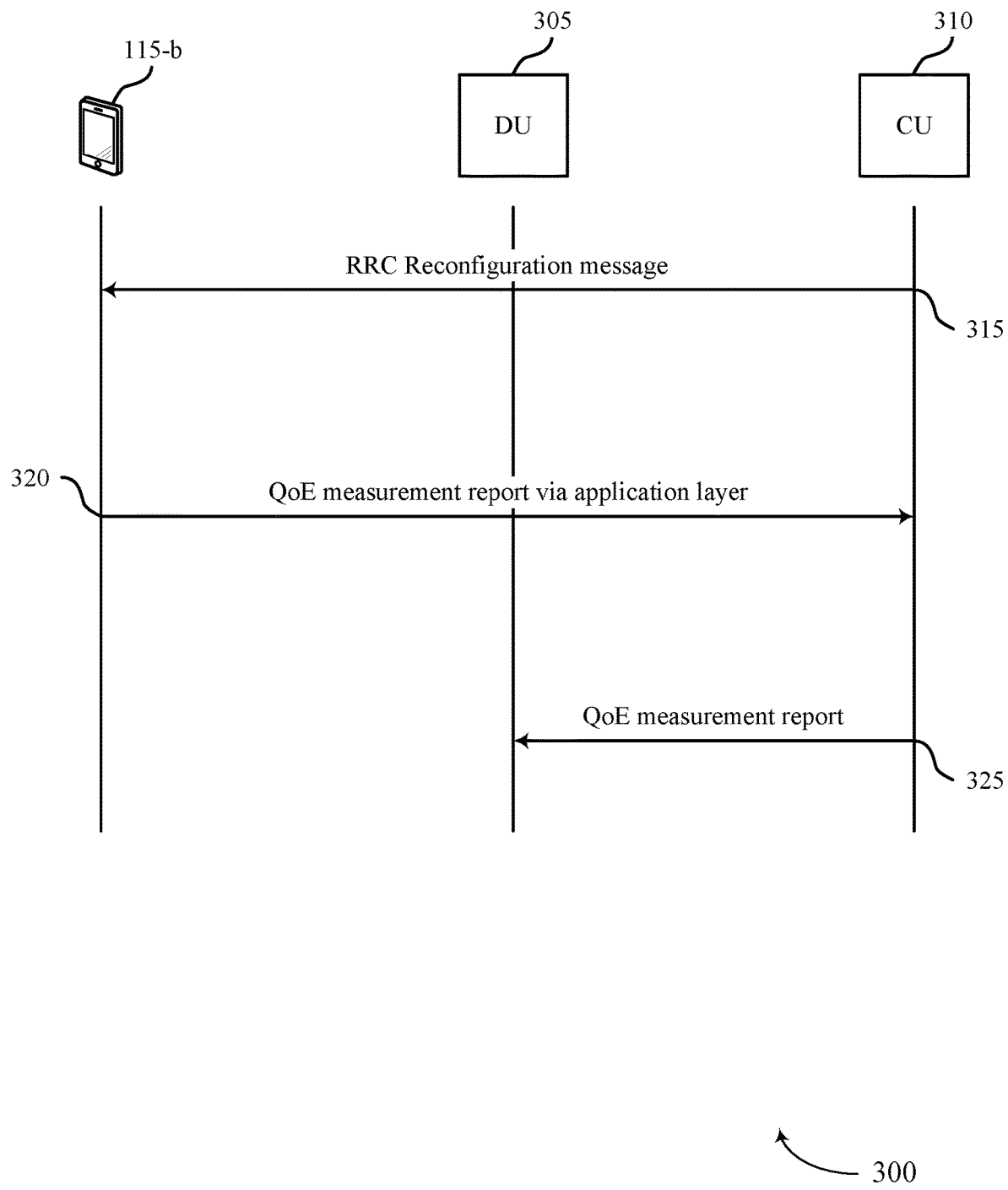
FIGS. 3 through 5 illustrate examples of process flows that support QoE measurement and reporting in accordance with aspects of the present disclosure.

FIG. 3 illustrates an example of a process flow 300 that supports QoE measurement and reporting in accordance with aspects of the present disclosure. The process flow 300 may illustrate an example QoE measurement and reporting procedure. For example, a base station may be split into a CU 310 and at least one DU 305, where the CU 310, or DU 305, or both may participate with UE 115-b in the QoE measurement and reporting procedure. CU 310 and DU 305 may be part of a base station, where the base station and UE 115-b may be examples of the corresponding wireless devices described with reference to FIGS. 1 and 2. Alternative examples of the following may be implemented, where some steps are performed in a different order than described or are not performed at all. In some cases, steps may include additional features not mentioned below, or further steps may be added.

As described with reference to FIG. 2, a UE 115 (e.g., UE 115-b) may receive a base station-readable QoE configuration that may indicate one or more parameters to indicate how UE 115-b should measure QoE metrics and report the QoE measurements. For example, at 315, CU 310 (or a base station, or DU 305) may transmit an RRC reconfiguration message to UE 115-b. The RRC reconfiguration message may include an application layer measurement configuration field (e.g., measConfigAppLayer). The application layer measurement configuration may include a QoE configuration for measuring and reporting QoE measurements to a QoE server, a base station-readable QoE configuration for measuring and reporting QoE measurements to a base station (or one or more units of a base station), and a service type that the QoE configurations are associated with. In some cases, UE 115-b may receive the RRC reconfiguration message while UE 115-b is in a connected mode with the base station of CU 310.

The base station-readable QoE configuration may indicate that UE 115-b should measure and report one or more metrics associated with the service associated with the service type indicated in the application layer measurement configuration field. In some cases, the one or more metrics may include one or more satisfaction levels where UE 115-b may determine a level of satisfaction associated with certain communication parameters UE 115-b is experiencing on a preconfigured scale. For example, of the one or more satisfaction levels may include an overall QoE satisfaction level. The overall QoE satisfaction level may be based on any number of communication parameters, or any number of other satisfaction levels associated with the service provided to UE 115-b. For example, the overall satisfaction level may be the average satisfaction level of a combined set of satisfaction levels (e.g., satisfaction levels associated with bitrate, delay, error). The scale associated with the overall QoE satisfaction level may include any number of integers. For example, the scale may include integers 1 through 5, where 1 may indicate an unacceptable quality (e.g., the functionality of the service is diminished or nonexistent at the current QoE), 2 may indicate that the overall satisfaction while using the service is lower than average, but the service (e.g., application) continues to function, 3 may indicate an average overall satisfaction level, 4 may indicate that the overall satisfaction level is above average, and a 5 may indicate the highest or near highest overall QoE UE 115-b has experienced.

In another example, the one or more satisfaction levels may include a bitrate satisfaction level, a delay satisfaction level, or a packet error rate (PER) satisfaction level, or a combination thereof. The scales of each of the one or more satisfaction levels may be the same or different. For example, each satisfaction level may be associated with a scale of the same granularity, where each satisfaction level (e.g., overall, bitrate, delay, PER) is associated with a scale of 1 through 5. In another example, each satisfaction level may be associated with a different scale such that the overall satisfaction level may be assigned a scale of 1 through 5, where the bitrate satisfaction level may be assigned a scale of 1 through 10, and the delay satisfaction level may be assigned a scale of 1 through 3. The scale associated with each satisfaction level and what each number means may be a static or semi-static configuration, or may be configured dynamically.

In some cases, the one or more metrics may include average throughput associated with the service, a retransmission probability (e.g., how likely communications associated with the service will need to be retransmitted), or an indication of delay associated with the service, where UE 115-b may measure and report numerical values (e.g., actual values measured rather than an integer on a scale) for each of the throughput, retransmission probability, and delay metrics. In some cases, as part of the indication of delay, UE 115-a may measure an average delay experienced with the service, and in some cases, the jitter (e.g., standard deviation) associated with the average. Additionally or alternatively, the one or more metrics may include hypertext transmission protocol (HTTP) and/or hypertext transfer protocol secure (HTTPS) QoE related metrics such as an average HTTP response time, an average HTTPS response time, or both and/or, in some cases, may include a connection setup time.

The QoE configuration intended for the QoE server may indicate that UE 115-b should measure one or more metrics associated with the service associated with the service type indicated in the application layer measurement configuration field. In some cases, one or more of the metrics indicated in the QoE server configuration may be the same as one or more of the metrics indicated in the base station-readable QoE report. For example, the QoE server configuration may indicate the UE 115-b should measure and report at least one or more of a throughput associated with the service, a retransmission probability, an indication of delay associated with the service, etc.

In response to receiving the RRC reconfiguration message, UE 115-b may identify the one or more metrics to measure based on the QoE server configuration and the base station-readable QoE configuration. UE 115-b may measure the one or more metrics associated with the service indicated in the RRC reconfiguration message and configure a report to transmit to the base station. In some cases, UE 115-b may configure the report to be transmitted to the CU 310 of the base station. In some cases, UE 115-b may receive an indication to configure and transmit the report to the CU 310, where the indication may be included in the RRC reconfiguration message, in some other message, or may be preconfigured.

At 320, UE 115-b may transmit the report to the CU 310. In some cases, the report may be associated with the application layer of UE 115-b. For example, UE 115-b may transmit the report as a measReportAppLayer message. The report may include the QoE server report, or the base station-readable report, or both. Additionally or alternatively, the report may include an indication of the service type associated with the base station-readable QoE report. In some cases, the CU 310 may relay the QoE server report to the QoE server.

At 325, the CU 310 may transmit a QoE measurement report to the DU 305. In some implementations, the QoE measurement report the CU 310 may transmit to the DU 305 may be referred to as a non-real time QoE report. The QoE measurement report to the DU 305 may include at least a portion of the base station-readable QoE measurements received by the CU 310. Additionally or alternatively, the QoE measurement report to the DU 305 may include an indication of the service type associated with the QoE measurement report. In some cases, the CU 310 may transmit the QoE measurement report to the DU 305 over the F1 application protocol (F1AP) interface. Additionally or alternatively, the CU 310 may utilize a UE context setup or modification procedure to forward the base station-readable QoE metrics to the DU 305.

As both the CU 310 and the DU 305 received the base station-readable QoE measurements, the CU 310, or the DU 305, or both may perform adjustments to one or more parameters for communicating with UE 115-*b* that are associated with the service to improve (e.g., optimize) QoE.

Figure 4:
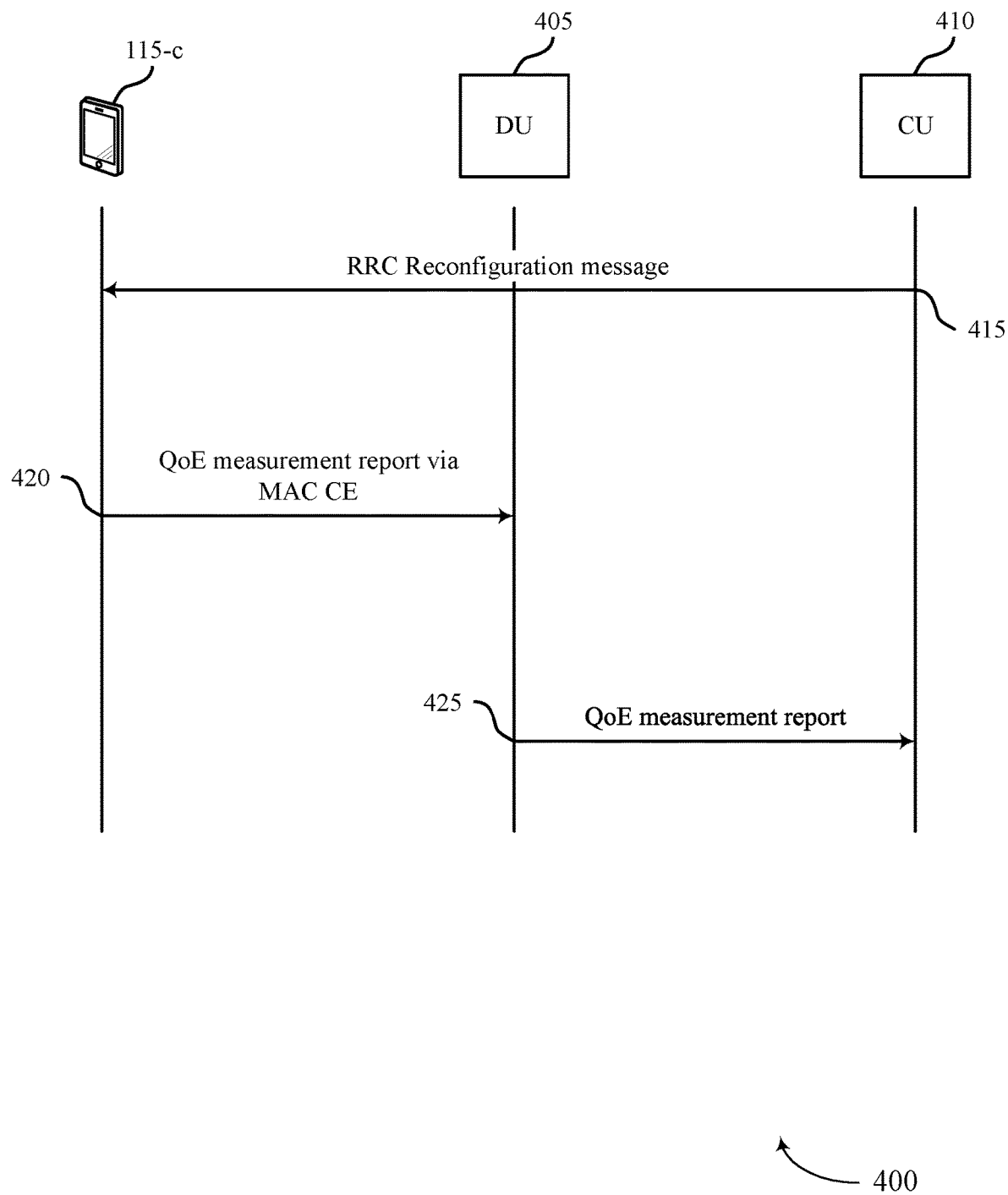

FIG. 4 illustrates an example of a process flow 400 that supports QoE measurement and reporting in accordance with aspects of the present disclosure. The process flow 400 may illustrate an example QoE measurement and reporting procedure. For example, a base station may be split into a CU 410 and at least one DU 405, where the CU 410, or DU 405, or both may participate with UE 115-*c* in the QoE measurement and reporting procedure. CU 410 and DU 405 may be part of a base station, where the base station and UE 115-*c* may be examples of the corresponding wireless devices described with reference to FIGS. 1 through 3. Alternative examples of the following may be implemented, where some steps are performed in a different order than described or are not performed at all. In some cases, steps may include additional features not mentioned below, or further steps may be added.

As described with reference to FIG. 3, a UE 115 (e.g., UE 115-*c*) may receive a base station-readable QoE configuration that may indicate one or more parameters to indicate how UE 115-*c* should measure QoE metrics and report the QoE measurements. For example, at 415, CU 410 (or a base station, or DU 405) may transmit an RRC reconfiguration message to UE 115-*c*. The RRC reconfiguration message may include an application layer measurement configuration field (e.g., measConfigAppLayer). The application layer measurement configuration may include a QoE configuration for measuring and reporting QoE measurements to a QoE server, a base station-readable QoE configuration for measuring and reporting QoE measurements to a base station (or one or more units of a base station), and a service type that the QoE configurations are associated with. In some cases, UE 115-*c* may receive the RRC reconfiguration message while UE 115-*c* is in a connected mode with the base station associated with the CU 410. The metrics included in each of the QoE server configuration and the base station-readable QoE configuration are described in the description of FIG. 3.

In response to receiving the RRC reconfiguration message, UE 115-*c* may identify the one or more metrics (e.g., throughput, satisfaction levels, connection setup time, etc. as described with reference to FIG. 3) to measure based on the QoE server configuration and the base station-readable configuration. UE 115-*c* may measure the one or more metrics associated with the service indicated in the RRC reconfiguration message and configure a report to transmit to the base station. In some cases, UE 115-*b* may configure the report to be transmitted to the DU 405 of the base station. In some cases, UE 115-*b* may receive an indication to configure and transmit the report to the DU, where the indication may be included in the RRC reconfiguration message, some other message, or may be preconfigured.

At 420, UE 115-*c* may transmit the report to the DU 405. The report may include the QoE server report, or the base station-readable report, or both. Additionally or alternatively, the report may include an indication of the service type associated with the base station-readable QoE report. In some cases, UE 115-*c* may transmit the base station-readable report to the DU 405, and transmit the QoE server report to the CU 410, where the CU 410 may relay the QoE server report to the QoE server. In some cases, UE 115-*c* may transmit the report via a MAC-CE. As the report may be transmitted via a MAC-CE, the QoE report (including the base station-readable report, or the QoE server report, or both) may be referred to as a real-time report because MAC-CEs may be transmitted on the order of seconds.

At 425, the DU 405 may transmit the base station-readable QoE measurement report, or the QoE server report, or both to the CU 410. In the case where the DU 405 transmits the QoE server report to the CU 410, the CU 410 may relay the QoE server report to the QoE server (e.g., in a non-real-time, or a real-time report). In some implementations, the QoE measurement report the DU 405 may transmit to the CU 410 may be referred to as a real-time QoE report. In some cases, the QoE measurement report to the CU 410 may include an indication of the service type associated with the QoE measurement report. In some cases, the DU 405 may transmit the QoE measurement report to the CU 410 over the F1AP interface. Additionally or alternatively, the DU 405 may transmit the QoE measurement report to the CU control plane (CU-CP), such as over the F1AP interface, and the CU-UP may send the QoE measurement report to the CU user plane (CU-UP) via an E1 application protocol (E1AP) interface. The CU-CP may send the QoE measurement report to the CU-UP via a bearer context setup or modification procedure.

As both the CU 410 and the DU 405 received the base station-readable QoE measurements, the CU 410, or the DU 405, or both may perform adjustments to one or more parameters for communicating with UE 115-*c* that are associated with the service to improve (e.g., optimize) QoE.

Figure 5:
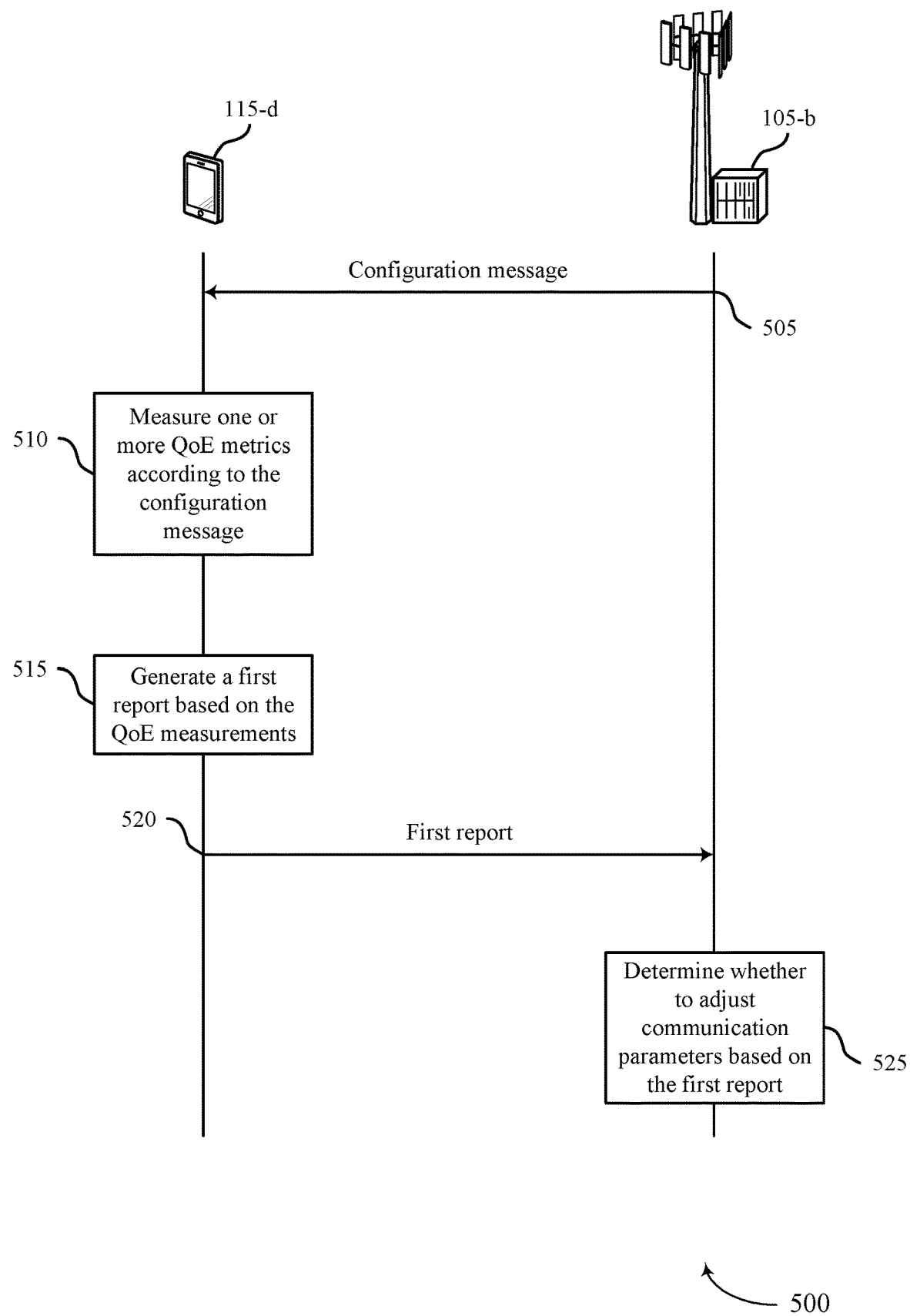

FIG. 5 illustrates an example of a process flow 500 that supports QoE measurement and reporting in accordance with aspects of the present disclosure. The process flow 500 may illustrate an example QoE measurement and reporting procedure. For example, UE 115-*d* may measure QoE metrics and report the QoE measurements to base station 105*b*. Base station 105-*d* and UE 115-*d* may be examples of the corresponding wireless devices described with reference to FIGS. 1 through 4. In some cases, instead of UE 115-*d* implementing the QoE measurement and reporting procedure, a different type of wireless device (e.g., a base station 105) may perform the QoE measurement and reporting procedure. Alternative examples of the following may be implemented, where some steps are performed in a different order than described or are not performed at all. In some cases, steps may include additional features not mentioned below, or further steps may be added.

At 505, UE 115-*d* may receive, from base station 105-*b* (or from one or more units of base station 105-*b*), a configuration message that includes a first configuration for reporting QoE measurements to a base station and a second configuration for reporting QoE measurements to a QoE server. The configuration message may be received from a CU of base station 105-*b*. In some implementations, the configuration message may include a type of service with which the QoE measurements are associated.

At 510, UE 115-*d* may measure one or more QoE metrics in accordance with the configuration message.

At 515, UE 115-*d* may generate a first report for the base station based on the QoE measurements and the first configuration. In some cases, the first report may include a type of service provided to UE 115-*d* via base station 105-*b* and with which the one or more QoE measurements are associated. The first report may include a real time QoE report indicating the one or more QoE measurements.

At 520, UE 115-*d* may transmit, to base station 105-*b* (or to one or more units of base station 105-*b*), the first report in accordance with the first configuration. In some cases, UE 115-*d* may transmit the first report to a CU of base station 105-*b*, such as, via an application layer report in accordance with the first configuration. In some cases, UE 115-*d* may transmit the first report to the DU of base station 105-*b*. UE 115-*d* may transmit the first report to the DU via an uplink MAC-CE in accordance with the first configuration.

As part of transmitting the first report, UE 115-*d* may transmit a set of QoE metrics that are formatted to be readable by base station 105-*b*. The set of QoE metrics may include an overall QoE satisfaction level metric as one of the set of QoE metrics, the overall QoE satisfaction level metric indicating a level of satisfaction associated with a service provided to UE 115-*d* via base station 105-*b*. The set of QoE metrics may include a bitrate satisfaction level metric as one of the set of QoE metrics, the bitrate satisfaction level indicating a level of satisfaction associated with a bitrate used for communications pertaining to a service provided to UE 115-*d* via base station 105-*b*. The set of QoE metrics may include a delay satisfaction level metric as one of the set of QoE metrics, the delay satisfaction level indicating a level of satisfaction associated with an experienced delay in communications pertaining to a service provided to UE 115-*d* via base station 105-*b*. The set of QoE metrics may include an error rate satisfaction level metric as one of the set of QoE metrics, the error rate satisfaction level indicating a level of satisfaction associated with a PER used for communications pertaining to a service provided to UE 115-*d* via base station 105-*b*. The set of QoE metrics may include an indication of an average throughput associated with communications pertaining to a service provided to UE 115-*d* via base station 105-*b*, an indication of a retransmission probability for the communications pertaining to the service, a standard deviation associated with the communications pertaining to the service, or a combination thereof. The set of QoE metrics may include an indication of an average HTTP response time associated with communications pertaining to a service provided to UE 115-*d* via base station 105-*b*, a connection setup time for the communications pertaining to the service, or a combination thereof.

In some cases, UE 115-*d* may generate a second report for the QoE server based on the QoE measurements and the second configuration, and transmitting the second report to the QoE server via base station 105-*b* such that UE 115-*d* may transmit the second report to base station 105-*b* and base station 105-*b* may transmit (e.g., relay) the second report to the QoE server.

In some cases, base station 105-*b* may determine, based on the set of QoE measurements included in the first report, whether to adjust one or more parameters for communicating with UE 115-*d* in association with a service provided to UE 115-*d*, where the set of QoE measurements relate to the service.

Figure 6:
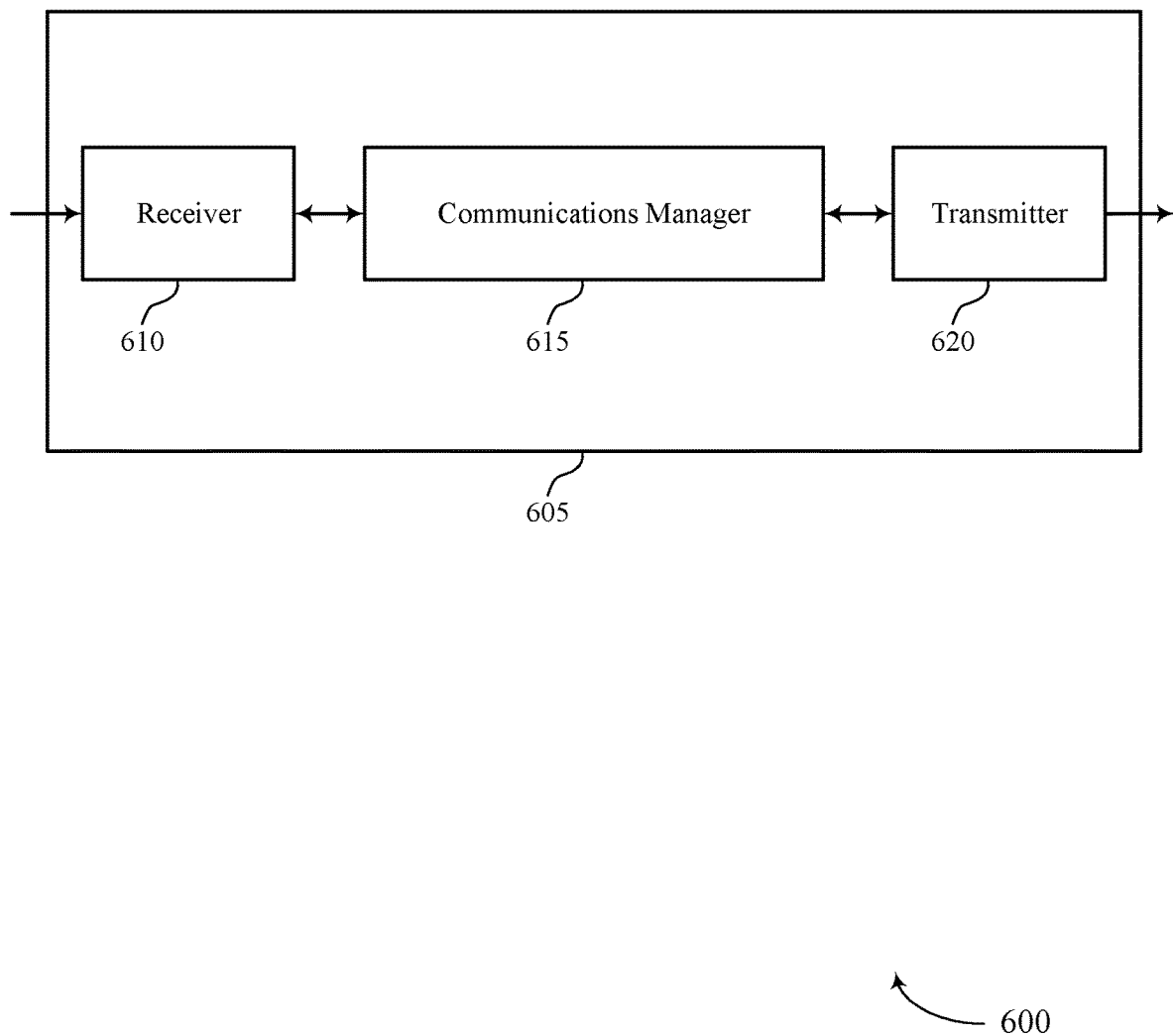
FIGS. 6 and 7 show block diagrams of devices that support QoE measurement and reporting in accordance with aspects of the present disclosure.

FIG. 6 shows a block diagram 600 of a device 605 that supports QoE measurement and reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to QoE measurement and reporting, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration message that includes a first configuration for reporting QoE measurements to a base station and a second configuration for reporting QoE measurements to a QoE server, measure one or more QoE metrics in accordance with the configuration message, generate a first report for the base station based on the QoE measurements and the first configuration, and transmit the first report to the base station in accordance with the first configuration. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to more efficiently report QoE measurements to increase the efficiency of optimizing traffic parameters associated with QoE by another device. For example, a device 605 may measure QoE metrics and report the QoE measurements to a base station (or a unit of the base station), where the QoE report may be a real-time report, or a base station-readable report, or both. The base station or one or more units of the base station may efficiently utilize the report to determine whether to adjust parameters for communicating with the device 605 in association with a service provided to the device 605.

Based on implementing the QoE measurement and reporting techniques as described herein, a processor of a UE 115

(e.g., controlling the receiver 610, the transmitter 620, or the transceiver 920 as described with reference to FIG. 9) may increase reliability and efficiency in the communication of QoE measurements between a UE 115 and a base station (or one or more units of the base station).

Figure 7:
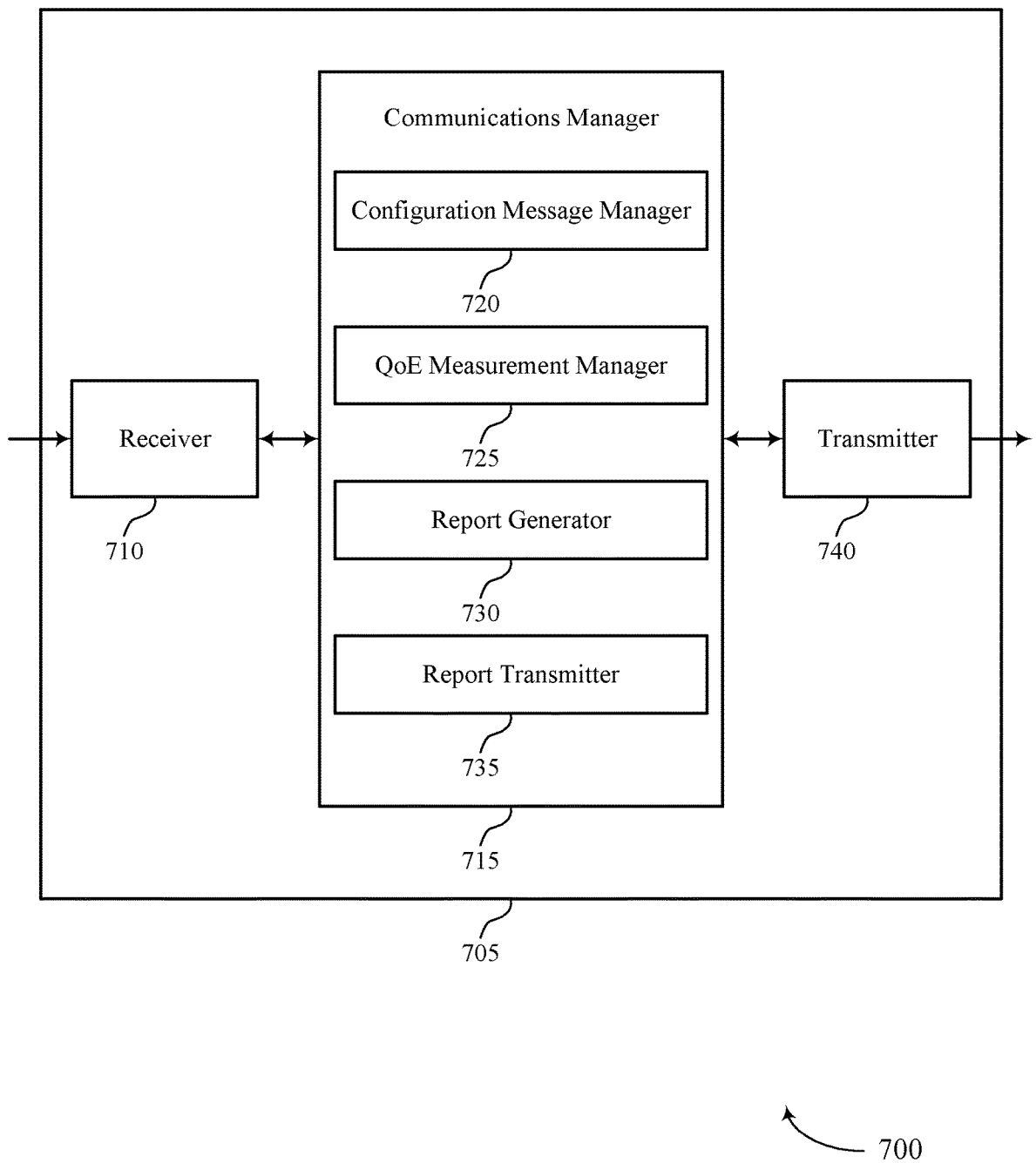

FIG. 7 shows a block diagram 700 of a device 705 that supports QoE measurement and reporting in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to QoE measurement and reporting, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration message manager 720, a QoE measurement manager 725, a report generator 730, and a report transmitter 735. The communications manager 715 may be an example of aspects of the communications manager 910 described herein.

The configuration message manager 720 may receive a configuration message that includes a first configuration for reporting QoE measurements to a base station and a second configuration for reporting QoE measurements to a QoE server.

The QoE measurement manager 725 may measure one or more QoE metrics in accordance with the configuration message. The report generator 730 may generate a first report for the base station based on the QoE measurements and the first configuration. The report transmitter 735 may transmit the first report to the base station in accordance with the first configuration.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
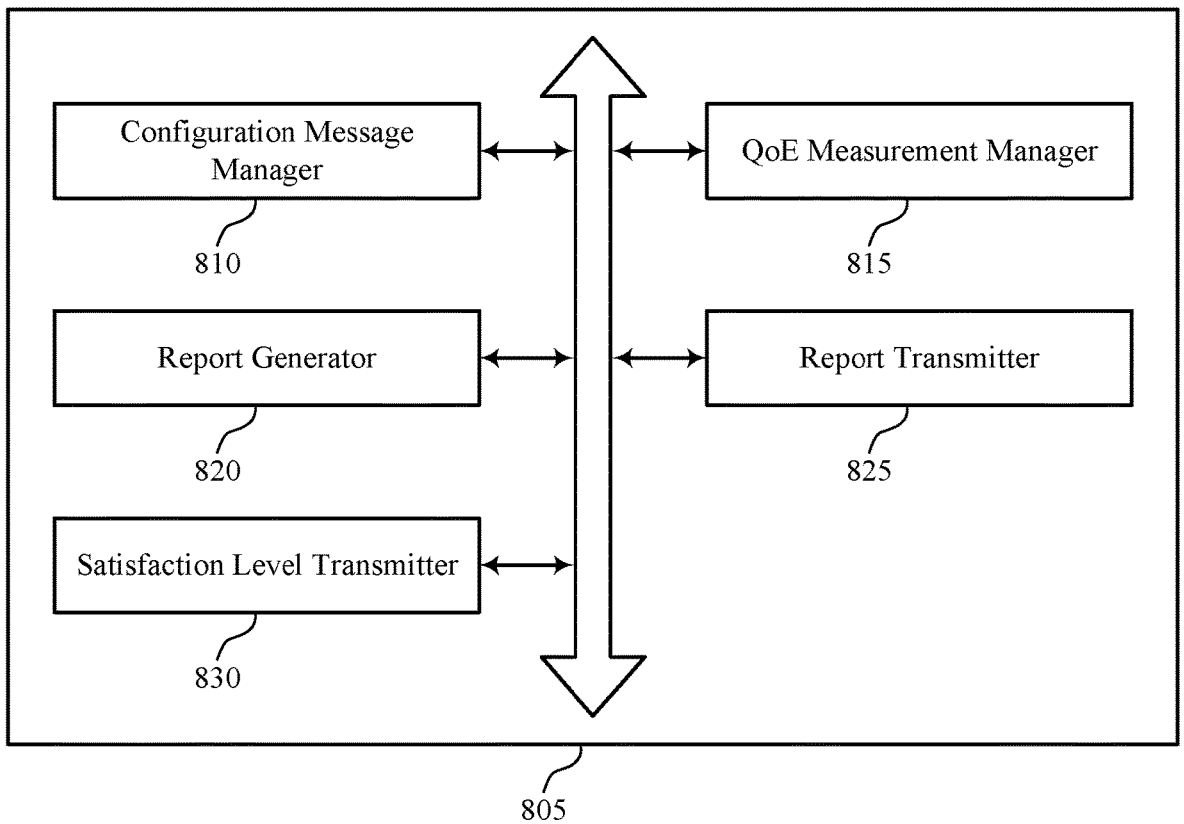
FIG. 8 shows a block diagram of a communications manager that supports QoE measurement and reporting in accordance with aspects of the present disclosure.

FIG. 8 shows a block diagram 800 of a communications manager 805 that supports QoE measurement and reporting in accordance with aspects of the present disclosure. The communications manager 805 may be an example of aspects of a communications manager 615, a communications manager 715, or a communications manager 910 described herein. The communications manager 805 may include a configuration message manager 810, a QoE measurement manager 815, a report generator 820, a report transmitter 825, and a satisfaction level transmitter 830. Each of these modules may communicate, directly or indirectly, with one another (e.g., via one or more buses).

The configuration message manager 810 may receive a configuration message that includes a first configuration for reporting QoE measurements to a base station and a second configuration for reporting QoE measurements to a QoE server. The QoE measurement manager 815 may measure one or more QoE metrics in accordance with the configuration message. The report generator 820 may generate a first report for the base station based on the QoE measurements and the first configuration. The report transmitter 825 may transmit the first report to the base station in accordance with the first configuration.

In some examples, the report transmitter 825 may transmit the first report to a CU of the base station, the base station including a CU and one or more DUs. In some examples, the report transmitter 825 may transmit the first report via an applications layer report in accordance with the first configuration.

In some examples, the report transmitter 825 may transmit the first report to a DU of the base station, the base station including a CU and one or more DUs. In some examples, the report transmitter 825 may transmit the first report via an uplink MAC-CE in accordance with the first configuration.

In some examples, the report transmitter 825 may transmit a set of QoE metrics that are formatted to be readable by the base station. In some examples, the report transmitter 825 may transmit, as one of the set of QoE metrics, an indication of an average throughput associated with communications pertaining to a service provided to the UE via the base station, an indication of a retransmission probability for the communications pertaining to the service, a standard deviation associated with the communications pertaining to the service, or a combination thereof. In some examples, the report transmitter 825 may transmit, as one of the set of QoE metrics, an indication of an average HTTP response time associated with communications pertaining to a service provided to the UE via the base station, a connection setup time for the communications pertaining to the service, or a combination thereof.

The satisfaction level transmitter 830 may transmit an overall QoE satisfaction level metric as one of the set of QoE metrics, the overall QoE satisfaction level metric indicating a level of satisfaction associated with a service provided to the UE via the base station. In some examples, the satisfaction level transmitter 830 may transmit a bitrate satisfaction level metric as one of the set of QoE metrics, the bitrate satisfaction level indicating a level of satisfaction associated with a bitrate used for communications pertaining to a service provided to the UE via the base station. In some examples, the satisfaction level transmitter 830 may transmit a delay satisfaction level metric as one of the set of QoE metrics, the delay satisfaction level indicating a level of satisfaction associated with an experienced delay in communications pertaining to a service provided to the UE via the base station. In some examples, the satisfaction level transmitter 830 may transmit an error rate satisfaction level metric as one of the set of QoE metrics, the error rate satisfaction level indicating a level of satisfaction associated with a PER used for communications pertaining to a service provided to the UE via the base station.

In some cases, the first report includes a type of service provided to the UE via the base station and with which the one or more QoE measurements are associated. In some cases, the first report includes a real time QoE report indicating the one or more QoE measurements.

In some cases, the configuration message is received from a CU of the base station. In some cases, the configuration message includes a type of service with which the QoE measurements are associated.

In some examples, the report generator 820 may generate a second report for the QoE server based on the QoE measurements and the second configuration. In some examples, the report transmitter 825 may transmit the second report to the QoE server via the base station.

Figure 9:
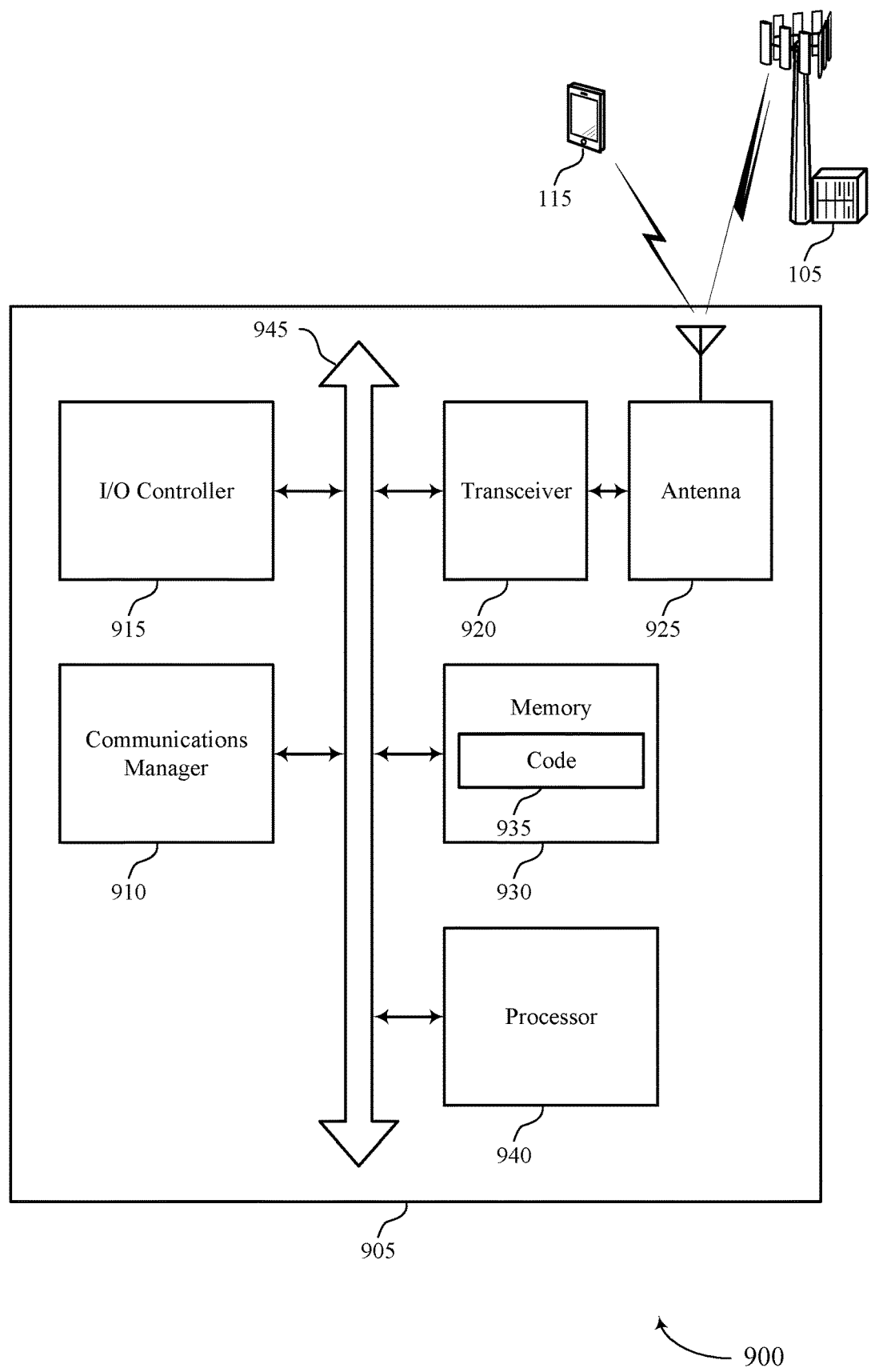
FIG. 9 shows a diagram of a system including a device that supports QoE measurement and reporting in accordance with aspects of the present disclosure.

FIG. 9 shows a diagram of a system 900 including a device 905 that supports QoE measurement and reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration message that includes a first configuration for reporting QoE measurements to a base station and a second configuration for reporting QoE measurements to a QoE server, measure one or more QoE metrics in accordance with the configuration message, generate a first report for the base station based on the QoE measurements and the first configuration, and transmit the first report to the base station in accordance with the first configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting QoE measurement and reporting).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
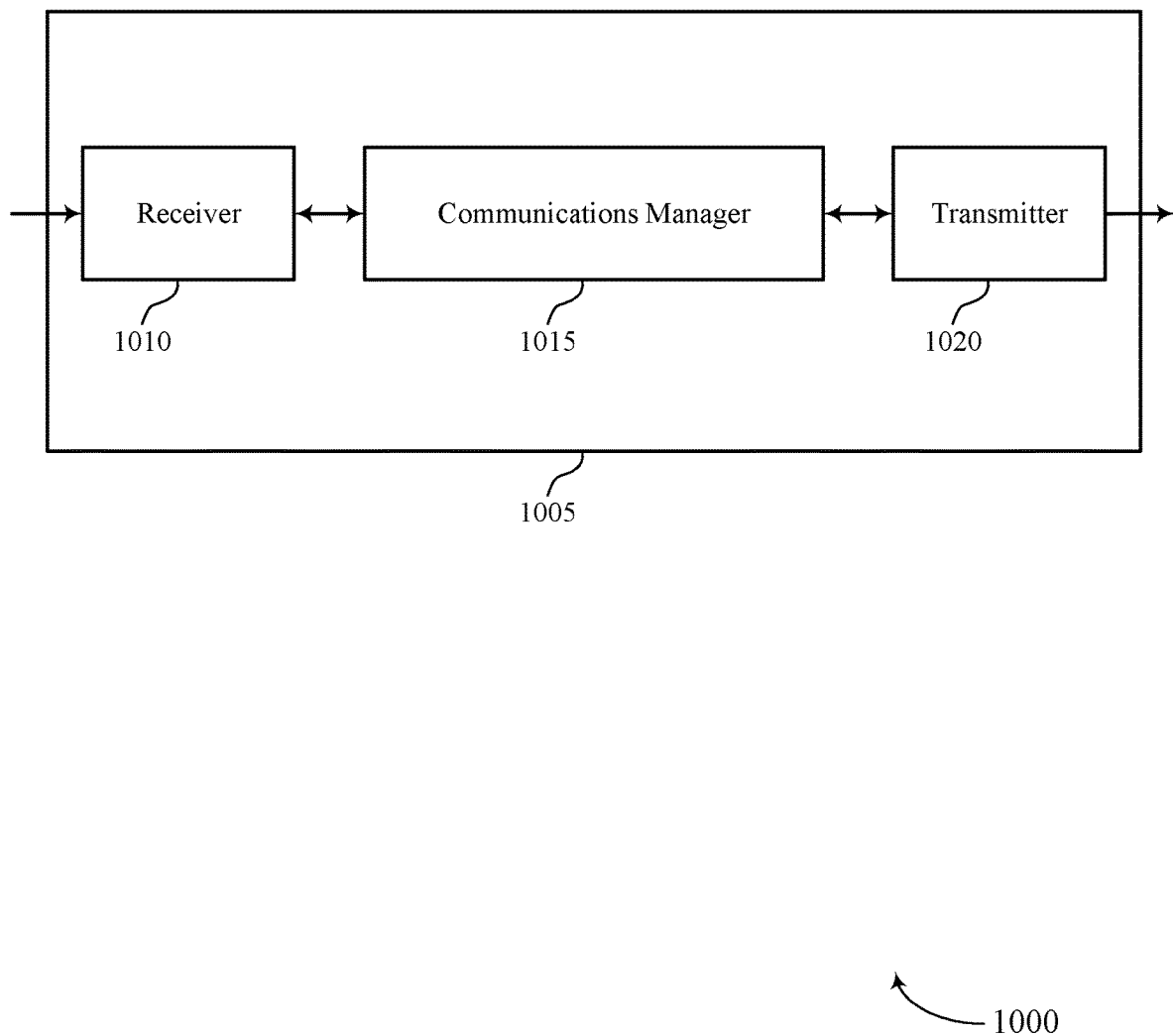
FIGS. 10 and 11 show block diagrams of devices that support QoE measurement and reporting in accordance with aspects of the present disclosure.

FIG. 10 shows a block diagram 1000 of a device 1005 that supports QoE measurement and reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to QoE measurement and reporting, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration message that includes a first configuration for reporting QoE measurements to the base station and a second configuration for reporting QoE measurements to a QoE server, receive, from the UE, a first report in accordance with the first configuration, the first report including a set of QoE measurements, and determine, based on the set of QoE measurements included in the first report, whether to adjust one or more parameters for communicating with the UE in association with a service provided to the UE, where the set of QoE measurements relate to the service. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
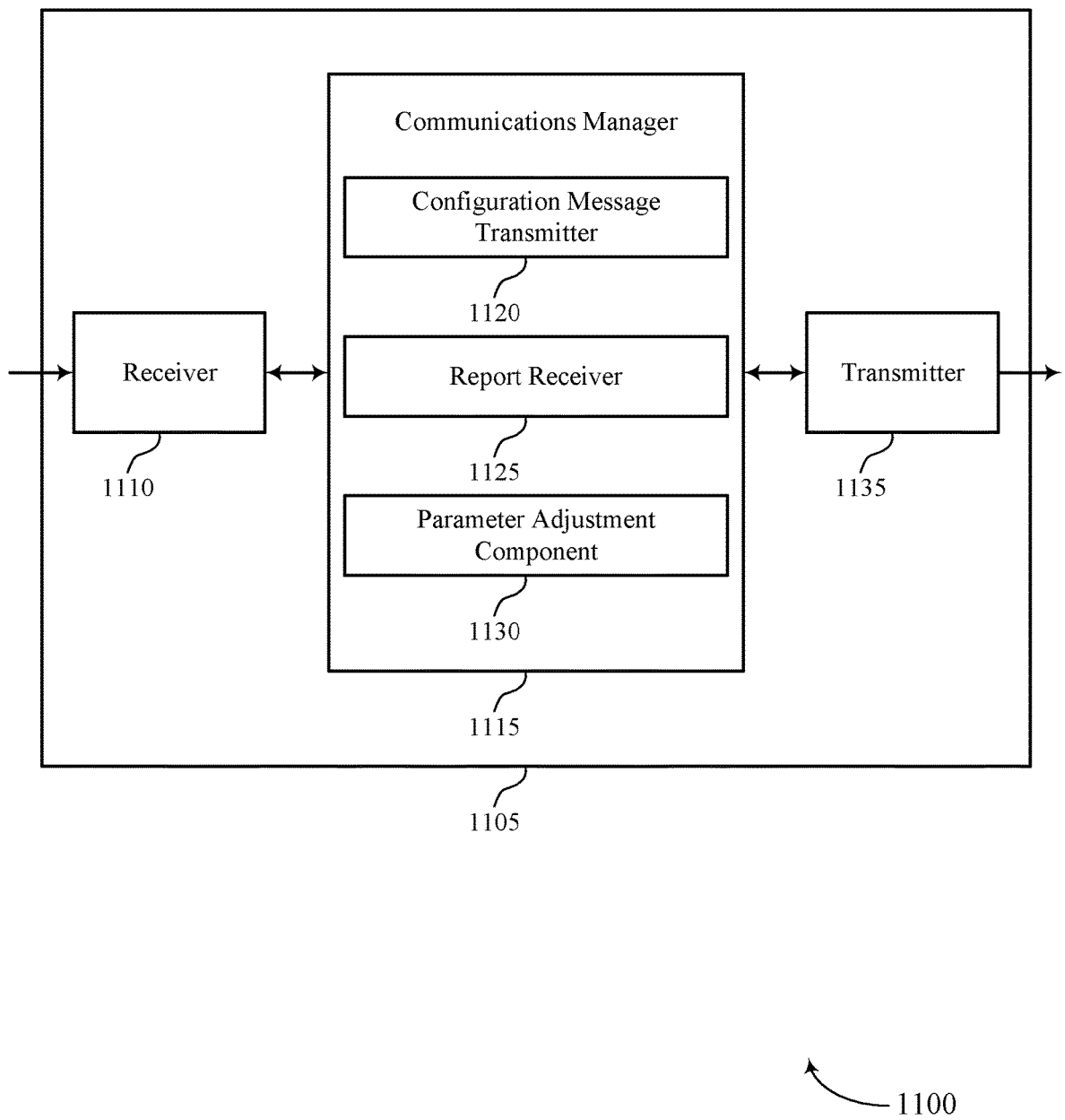

FIG. 11 shows a block diagram 1100 of a device 1105 that supports QoE measurement and reporting in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to QoE measurement and reporting, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration message transmitter 1120, a report receiver 1125, and a parameter adjustment component 1130. The communications manager 1115 may be an example of aspects of the communications manager 1310 described herein.

The configuration message transmitter 1120 may transmit, to a UE, a configuration message that includes a first configuration for reporting QoE measurements to the base station and a second configuration for reporting QoE measurements to a QoE server. The report receiver 1125 may receive, from the UE, a first report in accordance with the first configuration, the first report including a set of QoE measurements. The parameter adjustment component 1130 may determine, based on the set of QoE measurements included in the first report, whether to adjust one or more parameters for communicating with the UE in association with a service provided to the UE, where the set of QoE measurements relate to the service.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
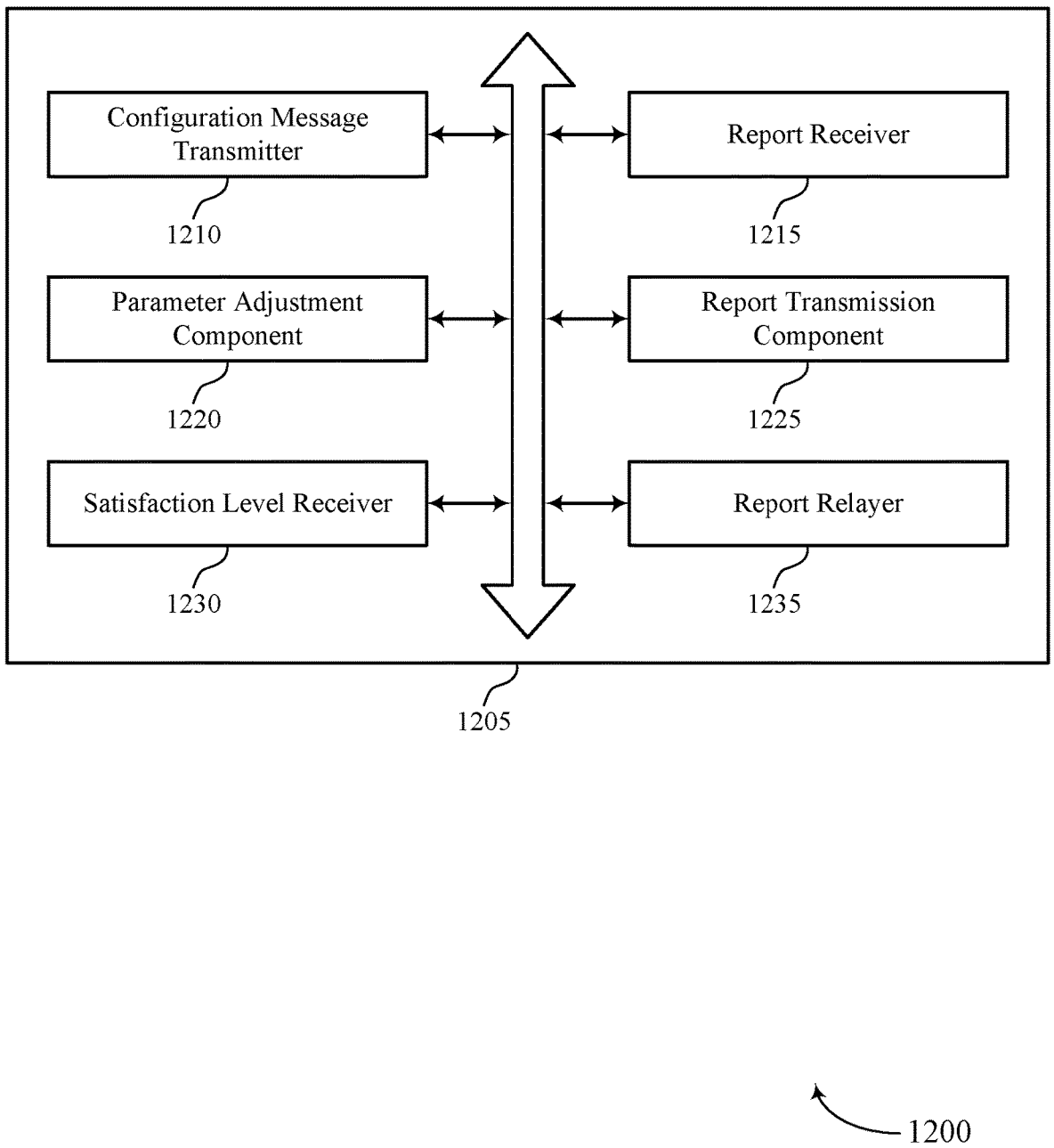
FIG. 12 shows a block diagram of a communications manager that supports QoE measurement and reporting in accordance with aspects of the present disclosure.

FIG. 12 shows a block diagram 1200 of a communications manager 1205 that supports QoE measurement and reporting in accordance with aspects of the present disclosure. The communications manager 1205 may be an example of aspects of a communications manager 1015, a communications manager 1115, or a communications manager 1310 described herein. The communications manager 1205 may include a configuration message transmitter 1210, a report receiver 1215, a parameter adjustment component 1220, a report transmission component 1225, a satisfaction level receiver 1230, and a report relayer 1235. Each of these modules may communicate, directly or indirectly, with one another (e.g., via one or more buses).

The configuration message transmitter 1210 may transmit, to a UE, a configuration message that includes a first configuration for reporting QoE measurements to the base station and a second configuration for reporting QoE measurements to a QoE server. The report receiver 1215 may receive, from the UE, a first report in accordance with the first configuration, the first report including a set of QoE measurements. The parameter adjustment component 1220 may determine, based on the set of QoE measurements included in the first report, whether to adjust one or more parameters for communicating with the UE in association with a service provided to the UE, where the set of QoE measurements relate to the service.

In some examples, the report receiver 1215 may receive the first report at a CU of the base station, the base station including a CU and one or more DUs. In some examples, the report receiver 1215 may receive the first report via an applications layer report in accordance with the first configuration. The report transmission component 1225 may transmit, to a DU of the base station, a third report including at least a portion of the QoE measurements included in the first report. In some cases, the third report includes a set of QoE metrics that are formatted to be readable by the base station and a type of service provided to the UE via the base station and with which the one or more QoE measurements are associated. In some cases, the CU of the base station transmits the third report to the DU of the base station via an F1 application protocol interface or via a UE Context Setup or Modification procedure. In some cases, the third report is a non-real time report.

In some examples, the report receiver 1215 may receive the first report at a DU of the base station, the base station including a CU and one or more DUs. In some examples, the report receiver 1215 may receive the first report via an uplink MAC-CE in accordance with the first configuration. In some examples, the report transmission component 1225 may transmit, to the CU of the base station, a third report including at least a portion of the QoE measurements included in the first report. In some cases, the third report includes a real-time QoE report received at the DU from the UE. In some cases, the DU of the base station transmits the third report to the CU of the base station via an F1 application protocol interface. In some cases, the CU includes a CU user plane and a CU control plane, where the CU control plane receives the third report from the DU and forwards the third report to the CU user plane via an E1 application protocol interface using a bearer context setup or modification procedure.

In some examples, the report receiver 1215 may receive a set of QoE metrics that are formatted to be readable by the base station. In some examples, the report receiver 1215 may receive, as one of the set of QoE metrics, an indication of an average throughput associated with communications pertaining to a service provided to the UE via the base station, an indication of a retransmission probability for the communications pertaining to the service, a standard deviation associated with the communications pertaining to the service, or a combination thereof. In some examples, the report receiver 1215 may receive, as one of the set of QoE metrics, an indication of an average HTTP response time associated with communications pertaining to a service provided to the UE via the base station, a connection setup time for the communications pertaining to the service, or a combination thereof.

The satisfaction level receiver 1230 may receive an overall QoE satisfaction level metric as one of the set of QoE metrics, the overall QoE satisfaction level metric indicating a level of satisfaction associated with a service provided to the UE via the base station. In some examples, the satisfaction level receiver 1230 may receive a bitrate satisfaction level metric as one of the set of QoE metrics, the bitrate satisfaction level metric indicating a level of satisfaction associated with a bitrate used for communications pertaining to a service provided to the UE via the base station. In some examples, the satisfaction level receiver 1230 may receive a delay satisfaction level metric as one of the set of QoE metrics, the delay satisfaction level metric indicating a level of satisfaction associated with an experienced delay in communications pertaining to a service provided to the UE via the base station. In some examples, the satisfaction level receiver 1230 may receive an error rate satisfaction level metric as one of the set of QoE metrics, the error rate satisfaction level metric indicating a level of satisfaction associated with a PER used for communications pertaining to a service provided to the UE via the base station.

In some cases, the first report includes a type of service provided to the UE via the base station and with which the one or more QoE measurements are associated. In some cases, the first report includes a real time QoE report indicating the one or more QoE measurements.

In some cases, the configuration message is transmitted from a CU of the base station. In some cases, the configuration message includes a type of service with which the QoE measurements are associated.

In some examples, the report receiver 1215 may receive, from the UE, the second report in accordance with the second configuration, where the intended recipient of the second report is the QoE server. The report relayer 1235 may relay the second report to the QoE server.

Figure 13:
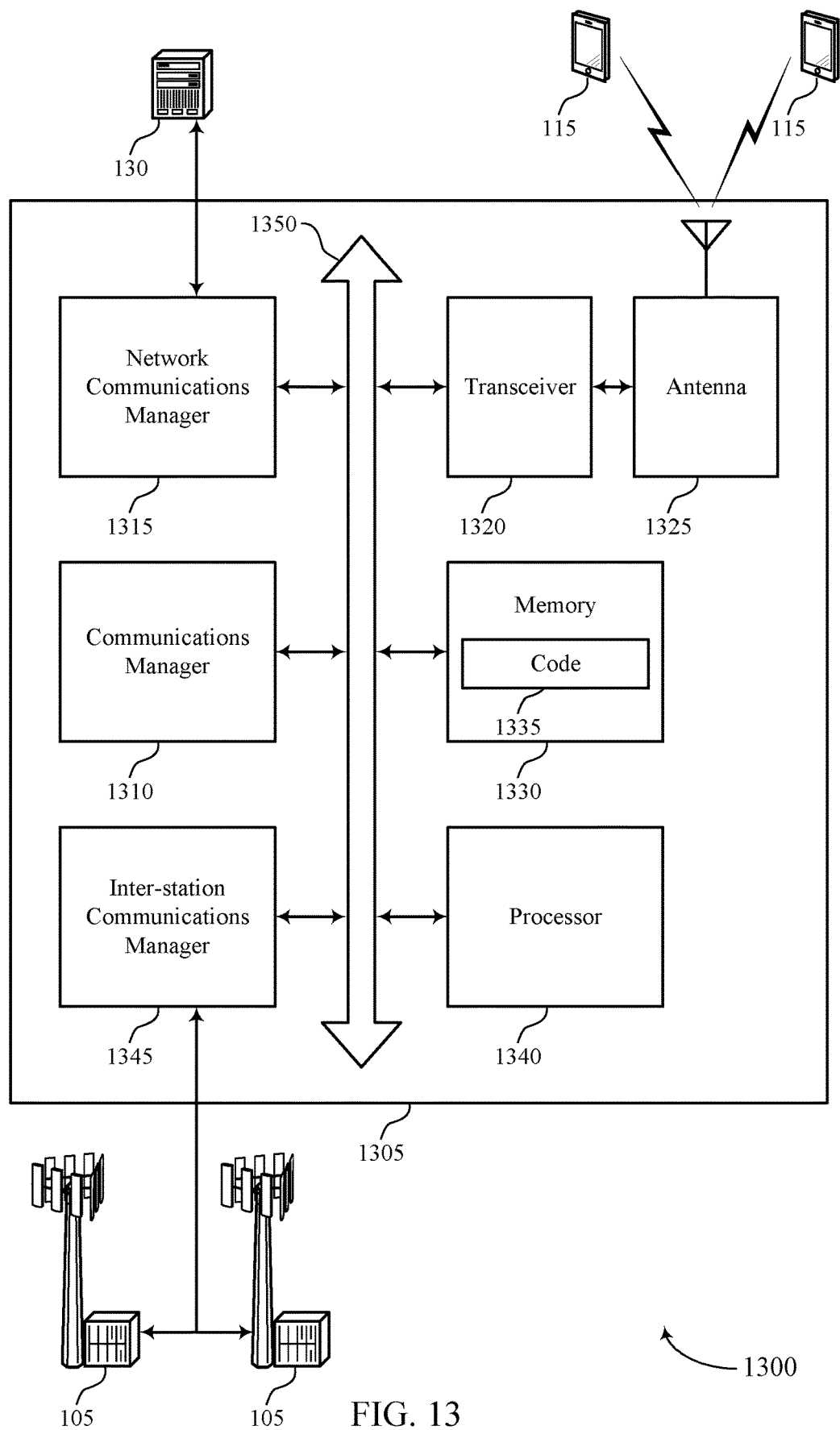
FIG. 13 shows a diagram of a system including a device that supports QoE measurement and reporting in accordance with aspects of the present disclosure.

FIG. 13 shows a diagram of a system 1300 including a device 1305 that supports QoE measurement and reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration message that includes a first configuration for reporting QoE measurements to the base station and a second configuration for reporting QoE measurements to a QoE server, receive, from the UE, a first report in accordance with the first configuration, the first report including a set of QoE measurements, and determine, based on the set of QoE measurements included in the first report, whether to adjust one or more parameters for communicating with the UE in association with a service provided to the UE, where the set of QoE measurements relate to the service.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting QoE measurement and reporting).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
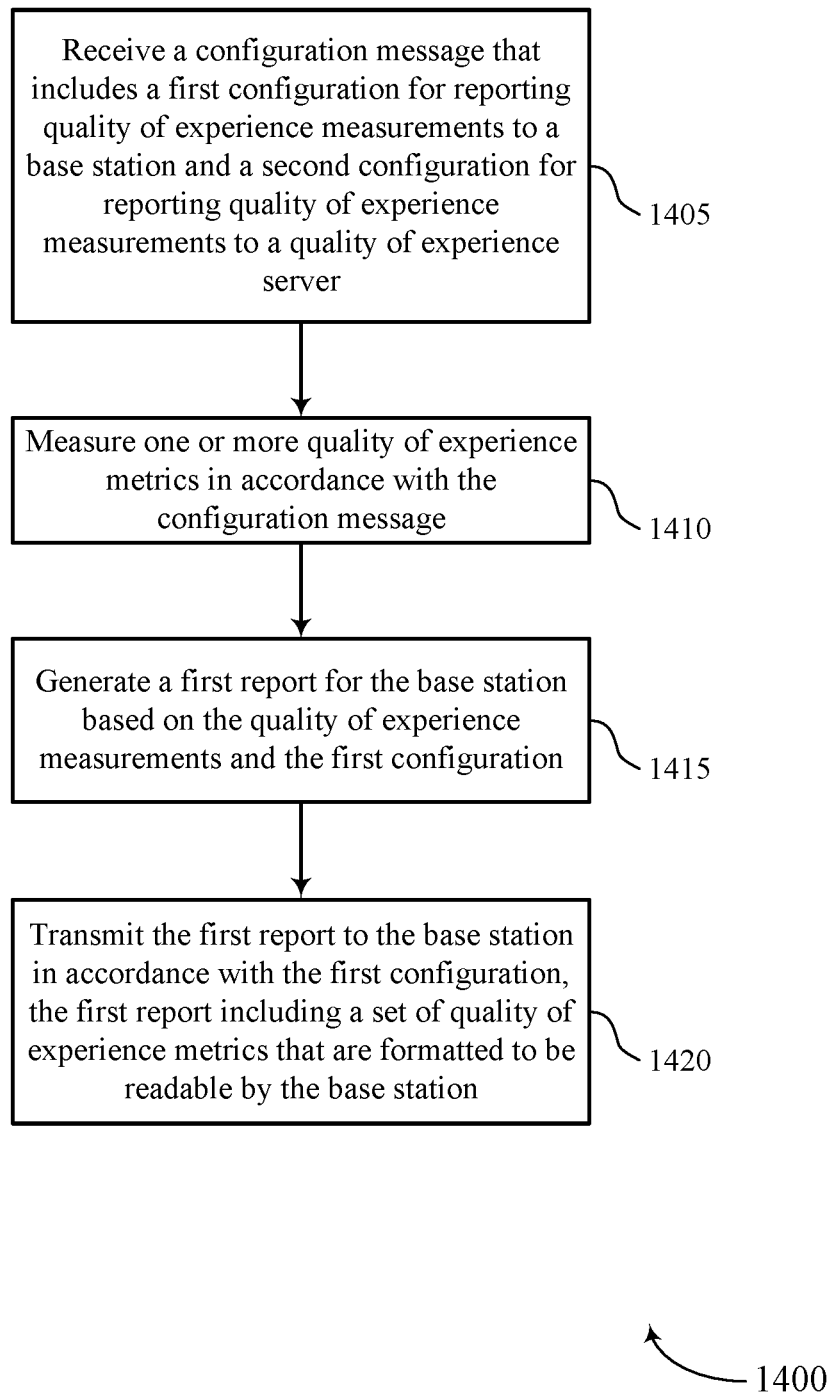
FIGS. 14 through 17 show flowcharts illustrating methods that support QoE measurement and reporting in accordance with aspects of the present disclosure.

FIG. 14 shows a flowchart illustrating a method 1400 that supports QoE measurement and reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a configuration message that includes a first configuration for reporting QoE measurements to a base station and a second configuration for reporting QoE measurements to a QoE server. The operations of 1405 may be performed according to the methods described herein. In some examples, aspects of the operations of 1405 may be performed by a configuration message manager as described with reference to FIGS. 6 through 9.

At 1410, the UE may measure one or more QoE metrics in accordance with the configuration message. The operations of 1410 may be performed according to the methods described herein. In some examples, aspects of the operations of 1410 may be performed by a QoE measurement manager as described with reference to FIGS. 6 through 9.

At 1415, the UE may generate a first report for the base station based on the QoE measurements and the first configuration. The operations of 1415 may be performed according to the methods described herein. In some examples, aspects of the operations of 1415 may be performed by a report generator as described with reference to FIGS. 6 through 9.

At 1420, the UE may transmit the first report to the base station in accordance with the first configuration, the first report including a set of QoE metrics that are formatted to be readable by the base station. The operations of 1420 may be performed according to the methods described herein. In some examples, aspects of the operations of 1420 may be performed by a report transmitter as described with reference to FIGS. 6 through 9.

Figure 15:
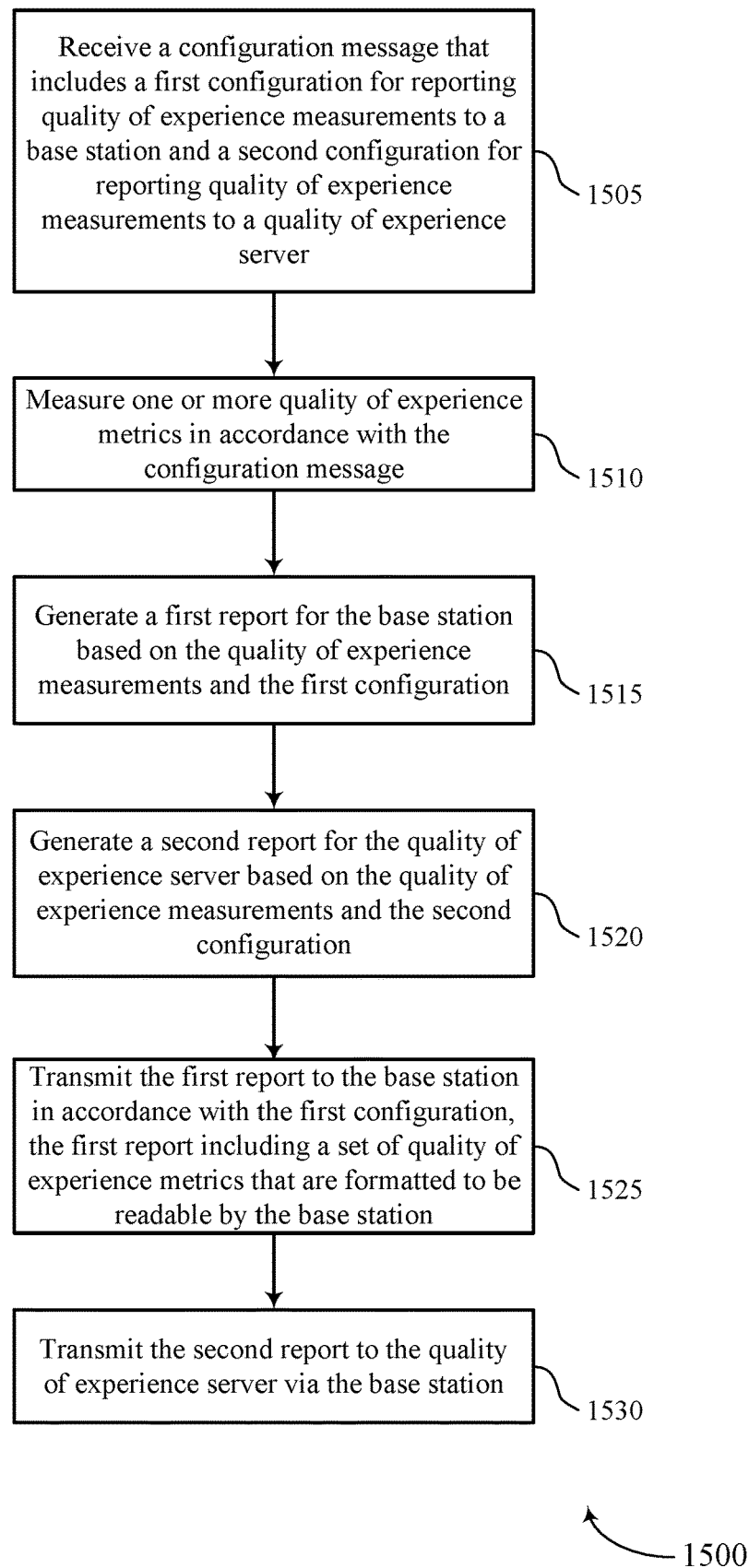

FIG. 15 shows a flowchart illustrating a method 1500 that supports QoE measurement and reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message that includes a first configuration for reporting QoE measurements to a base station and a second configuration for reporting QoE measurements to a QoE server. The operations of 1505 may be performed according to the methods described herein. In some examples, aspects of the operations of 1505 may be performed by a configuration message manager as described with reference to FIGS. 6 through 9.

At 1510, the UE may measure one or more QoE metrics in accordance with the configuration message. The operations of 1510 may be performed according to the methods described herein. In some examples, aspects of the operations of 1510 may be performed by a QoE measurement manager as described with reference to FIGS. 6 through 9.

At 1515, the UE may generate a first report for the base station based on the QoE measurements and the first configuration. The operations of 1515 may be performed according to the methods described herein. In some examples, aspects of the operations of 1515 may be performed by a report generator as described with reference to FIGS. 6 through 9.

At 1520, the UE may generate a second report for the QoE server based on the QoE measurements and the second configuration. The operations of 1520 may be performed according to the methods described herein. In some examples, aspects of the operations of 1520 may be performed by a report generator as described with reference to FIGS. 6 through 9.

At 1525, the UE may transmit the first report to the base station in accordance with the first configuration, the first report including a set of QoE metrics that are formatted to be readable by the base station. The operations of 1525 may be performed according to the methods described herein. In some examples, aspects of the operations of 1525 may be performed by a report transmitter as described with reference to FIGS. 6 through 9.

At 1530, the UE may transmit the second report to the QoE server via the base station. The operations of 1530 may be performed according to the methods described herein. In some examples, aspects of the operations of 1530 may be performed by a report transmitter as described with reference to FIGS. 6 through 9.

Figure 16:
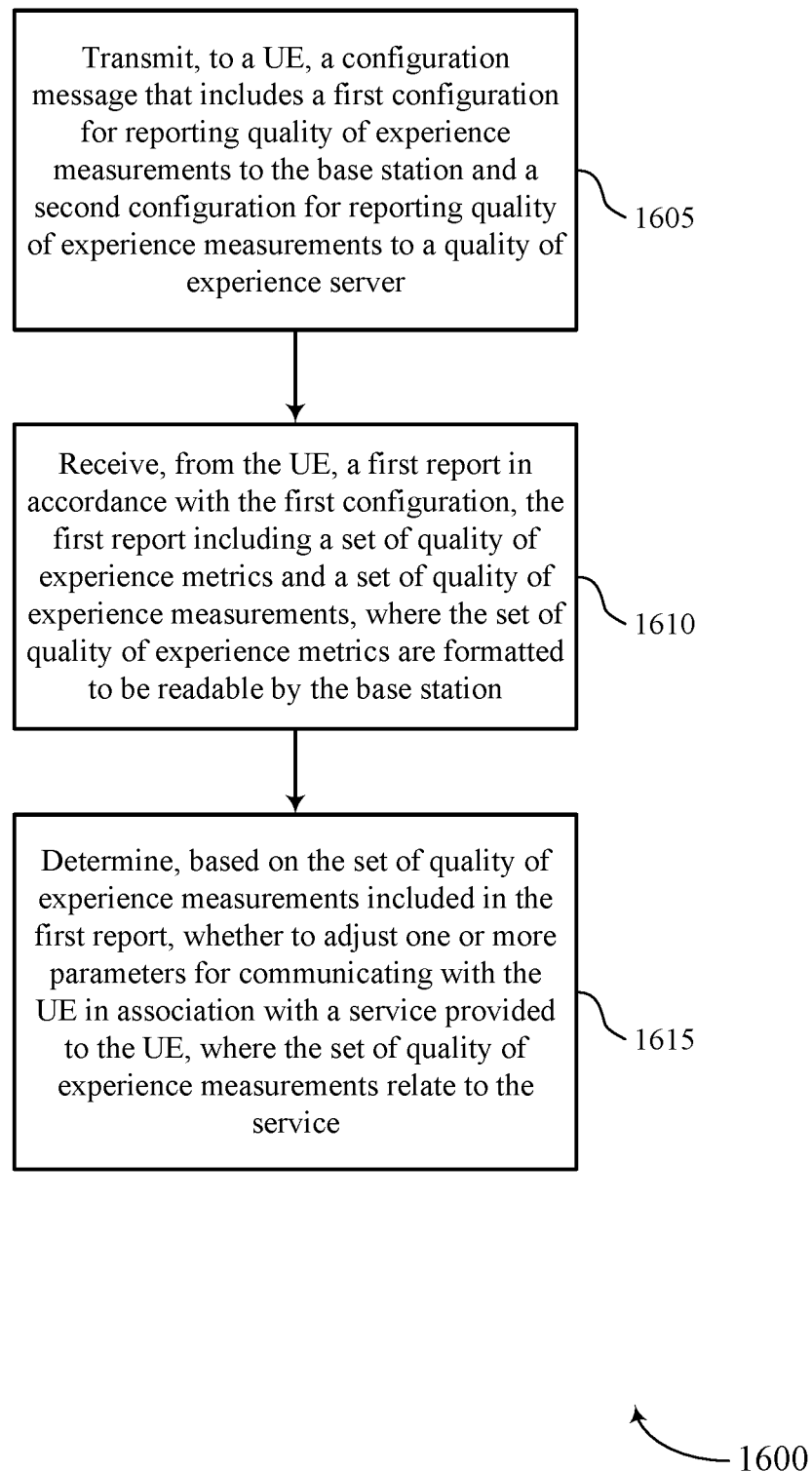

FIG. 16 shows a flowchart illustrating a method 1600 that supports QoE measurement and reporting in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration message that includes a first configuration for reporting QoE measurements to the base station and a second configuration for reporting QoE measurements to a QoE server. The operations of 1605 may be performed according to the methods described herein. In some examples, aspects of the operations of 1605 may be performed by a configuration message transmitter as described with reference to FIGS. 10 through 13.

At 1610, the base station may receive, from the UE, a first report in accordance with the first configuration, the first report including a set of QoE metrics and a set of QoE measurements, where the set of QoE metrics are formatted to be readable by the base station. The operations of 1610 may be performed according to the methods described herein. In some examples, aspects of the operations of 1610 may be performed by a report receiver as described with reference to FIGS. 10 through 13.

At 1615, the base station may determine, based on the set of QoE measurements included in the first report, whether to adjust one or more parameters for communicating with the UE in association with a service provided to the UE, where the set of QoE measurements relate to the service. The operations of 1615 may be performed according to the methods described herein. In some examples, aspects of the operations of 1615 may be performed by a parameter adjustment component as described with reference to FIGS. 10 through 13.

Figure 17:
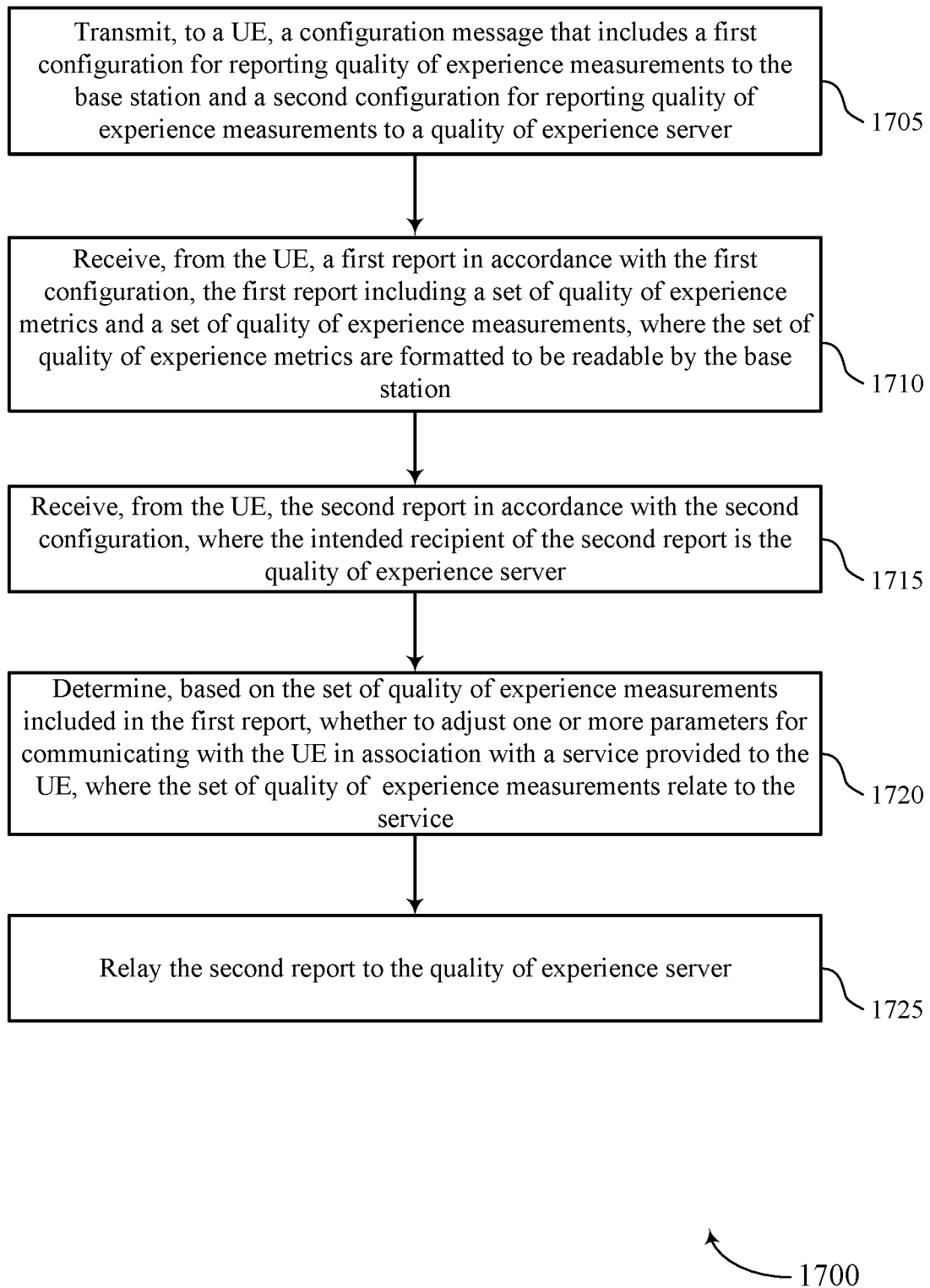

FIG. 17 shows a flowchart illustrating a method 1700 that supports QoE measurement and reporting in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration message that includes a first configuration for reporting QoE measurements to the base station and a second configuration for reporting QoE measurements to a QoE server. The operations of 1705 may be performed according to the methods described herein. In some examples, aspects of the operations of 1705 may be performed by a configuration message transmitter as described with reference to FIGS. 10 through 13.

At 1710, the base station may receive, from the UE, a first report in accordance with the first configuration, the first report including a set of QoE metrics and a set of QoE measurements, where the set of QoE metrics are formatted to be readable by the base station. The operations of 1710 may be performed according to the methods described herein. In some examples, aspects of the operations of 1710 may be performed by a report receiver as described with reference to FIGS. 10 through 13.

At 1715, the base station may receive, from the UE, the second report in accordance with the second configuration, where the intended recipient of the second report is the QoE server. The operations of 1715 may be performed according to the methods described herein. In some examples, aspects of the operations of 1715 may be performed by a report receiver as described with reference to FIGS. 10 through 13.

At 1720, the base station may determine, based on the set of QoE measurements included in the first report, whether to adjust one or more parameters for communicating with the UE in association with a service provided to the UE, where the set of QoE measurements relate to the service. The operations of 1720 may be performed according to the methods described herein. In some examples, aspects of the operations of 1720 may be performed by a parameter adjustment component as described with reference to FIGS. 10 through 13.

At 1725, the base station may relay the second report to the QoE server. The operations of 1725 may be performed according to the methods described herein. In some examples, aspects of the operations of 1725 may be performed by a report relayer as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Example 1: A method for wireless communications at a UE, comprising: receiving a configuration message that includes a first configuration for reporting quality of experience measurements to a base station and a second configuration for reporting quality of experience measurements to a quality of experience server; measuring one or more quality of experience metrics in accordance with the configuration message; generating a first report for the base station based at least in part on the quality of experience measurements and the first configuration; and transmitting the first report to the base station in accordance with the first configuration, the first report comprising a set of quality of experience metrics that are formatted to be readable by the base station.

Example 2: The method of example 1, wherein transmitting the first report to the base station further comprises: transmitting the first report to a central unit of the base station, the base station comprising the central unit and one or more distributed units.

Example 3: The method of example 2, wherein transmitting the first report to the central unit of the base station comprises: transmitting the first report via an applications layer report in accordance with the first configuration.

Example 4: The method of any of examples 1 through 3, wherein transmitting the first report to the base station further comprises: transmitting the first report to a distributed unit of the base station, the base station comprising a central unit and one or more distributed units.

Example 5: The method of example 4, wherein transmitting the first report to the distributed unit of the base station comprises: transmitting the first report via an uplink medium access control (MAC) control element (CE) in accordance with the first configuration.

Example 6: The method of any of examples 1 through 5, wherein transmitting the first report to the base station further comprises: transmitting a set of quality of experience metrics that are formatted to be readable by the base station.

Example 7: The method of example 6, wherein transmitting the set of quality of experience metrics comprises: transmitting an overall quality of experience satisfaction level metric as one of the set of quality of experience metrics, the overall quality of experience satisfaction level metric indicating a level of satisfaction associated with a service provided to the UE via the base station.

Example 8: The method of any of examples 6 or 7, wherein transmitting the set of quality of experience metrics comprises: transmitting a bitrate satisfaction level metric as one of the set of quality of experience metrics, the bitrate satisfaction level indicating a level of satisfaction associated with a bitrate used for communications pertaining to a service provided to the UE via the base station.

Example 9: The method of any of examples 6 through 8, wherein transmitting the set of quality of experience metrics comprises: transmitting a delay satisfaction level metric as one of the set of quality of experience metrics, the delay satisfaction level indicating a level of satisfaction associated with an experienced delay in communications pertaining to a service provided to the UE via the base station.

Example 10: The method of any of examples 6 through 9, wherein transmitting the set of quality of experience metrics comprises: transmitting an error rate satisfaction level metric as one of the set of quality of experience metrics, the error rate satisfaction level indicating a level of satisfaction associated with a packet error rate used for communications pertaining to a service provided to the UE via the base station.

Example 11: The method of any of examples 6 through 10, wherein transmitting the set of quality of experience metrics comprises: transmitting, as one of the set of quality of experience metrics, an indication of an average throughput associated with communications pertaining to a service provided to the UE via the base station, an indication of a retransmission probability for the communications pertaining to the service, a standard deviation associated with the communications pertaining to the service, or a combination thereof.

Example 12: The method of any of examples 6 through 11, wherein transmitting the set of quality of experience metrics comprises: transmitting, as one of the set of quality of experience metrics, an indication of an average hypertext transmission protocol response time associated with communications pertaining to a service provided to the UE via the base station, a connection setup time for the communications pertaining to the service, or a combination thereof.

Example 13: The method of any of examples 1 through 12, wherein the first report comprises a type of service provided to the UE via the base station and with which the one or more quality of experience measurements are associated.

Example 14: The method of any of examples 1 through 13, wherein the first report comprises a real time quality of experience report indicating the one or more quality of experience measurements.

Example 15: The method of any of examples 1 through 14, wherein the configuration message is received from a central unit of the base station.

Example 16: The method of any of examples 1 through 15, wherein the configuration message comprises a type of service with which the quality of experience measurements are associated.

Example 17: The method of any of examples 1 through 16, further comprising: generating a second report for the quality of experience server based at least in part on the quality of experience measurements and the second configuration; and transmitting the second report to the quality of experience server via the base station.

Example 18: An apparatus comprising at least one means for performing a method of any of examples 1 to 17.

Example 19: An apparatus for wireless communications comprising a processor; memory coupled with the processor; and instructions stored in the memory and executable by the processor to cause the apparatus to perform a method of any of examples 1 to 17.

Example 20: A non-transitory computer-readable medium storing code for wireless communications, the code comprising instructions executable by a processor to perform a method of any of examples 1 to 17.

Example 21: A method for wireless communications at a base station, comprising: transmitting, to a user equipment (UE), a configuration message that includes a first configuration for reporting quality of experience measurements to the base station and a second configuration for reporting quality of experience measurements to a quality of experience server; receiving, from the UE, a first report in accordance with the first configuration, the first report comprising a set of quality of experience metrics and a set of quality of experience measurements, wherein the set of quality of experience metrics are formatted to be readable by the base station; and determining, based at least in part on the set of quality of experience measurements included in the first report, whether to adjust one or more parameters for communicating with the UE in association with a service provided to the UE, wherein the set of quality of experience measurements relate to the service.

Example 22: The method of example 21, wherein receiving the first report from the UE further comprises: receiving the first report at a central unit of the base station, the base station comprising the central unit and one or more distributed units.

Example 23: The method of example 22, wherein receiving the first report at the central unit of the base station comprises: receiving the first report via an applications layer report in accordance with the first configuration.

Example 24: The method of any of examples 22 or 23, further comprising: transmitting, to a distributed unit of the base station, a third report comprising at least a portion of the quality of experience measurements included in the first report.

Example 25: The method of example 24, wherein the third report comprises a set of quality of experience metrics that are formatted to be readable by the base station and a type of service provided to the UE via the base station and with which the one or more quality of experience measurements are associated.

Example 26: The method of example 25, wherein the central unit of the base station transmits the third report to the distributed unit of the base station via an F1 application protocol interface or via a UE Context Setup or Modification procedure.

Example 27: The method of any of examples 25 or 26, wherein the third report is a non-real time report.

Example 28: The method of any of examples 21 through 27, wherein receiving the first report from the UE further comprises: receiving the first report at a distributed unit of the base station, the base station comprising a central unit and one or more distributed units.

Example 29: The method of example 28, wherein receiving the first report at the distributed unit of the base station comprises: receiving the first report via an uplink medium access control (MAC) control element (CE) in accordance with the first configuration.

Example 30: The method of any of examples 28 or 29, further comprising: transmitting, to the central unit of the base station, a third report comprising at least a portion of the quality of experience measurements included in the first report.

Example 31: The method of example 30, wherein the third report comprises a real-time quality of experience report received at the distributed unit from the UE.

Example 32: The method of any of examples 30 or 31, wherein the distributed unit of the base station transmits the third report to the central unit of the base station via an F1 application protocol interface.

Example 33: The method of any of examples 30 through 32, wherein the central unit comprises a central unit user plane and a central unit control plane, wherein the central unit control plane receives the third report from the distributed unit and forwards the third report to the central unit user plane via an E1 application protocol interface using a bearer context setup or modification procedure.

Example 34: The method of any of examples 21 through 33, wherein receiving the first report from the UE further comprises: receiving a set of quality of experience metrics that are formatted to be readable by the base station.

Example 35: The method of example 34, wherein receiving the set of quality of experience metrics comprises: receiving an overall quality of experience satisfaction level metric as one of the set of quality of experience metrics, the overall quality of experience satisfaction level metric indicating a level of satisfaction associated with a service provided to the UE via the base station.

Example 36: The method of any of examples 34 or 35, herein receiving the set of quality of experience metrics comprises: receiving a bitrate satisfaction level metric as one of the set of quality of experience metrics, the bitrate satisfaction level metric indicating a level of satisfaction associated with a bitrate used for communications pertaining to a service provided to the UE via the base station.

Example 37: The method of any of examples 34 through 36, wherein receiving the set of quality of experience metrics comprises: receiving a delay satisfaction level metric as one of the set of quality of experience metrics, the delay satisfaction level metric indicating a level of satisfaction associated with an experienced delay in communications pertaining to a service provided to the UE via the base station.

Example 38: The method of any of examples 34 through 37, wherein receiving the set of quality of experience metrics comprises: receiving an error rate satisfaction level metric as one of the set of quality of experience metrics, the error rate satisfaction level metric indicating a level of satisfaction associated with a packet error rate used for communications pertaining to a service provided to the UE via the base station.

Example 39: The method of any of examples 34 through 38, wherein receiving the set of quality of experience metrics comprises: receiving, as one of the set of quality of experience metrics, an indication of an average throughput associated with communications pertaining to a service provided to the UE via the base station, an indication of a retransmission probability for the communications pertaining to the service, a standard deviation associated with the communications pertaining to the service, or a combination thereof.

Example 40: The method of any of examples 34 through 39, wherein receiving the set of quality of experience metrics comprises: receiving, as one of the set of quality of experience metrics, an indication of an average hypertext transmission protocol response time associated with communications pertaining to a service provided to the UE via the base station, a connection setup time for the communications pertaining to the service, or a combination thereof.

Example 41: The method of any of examples 21 through 40, wherein the first report comprises a type of service provided to the UE via the base station and with which the one or more quality of experience measurements are associated.

Example 42: The method of any of examples 21 through 41, wherein the first report comprises a real time quality of experience report indicating the one or more quality of experience measurements.

Example 43: The method of any of examples 21 through 42, wherein the configuration message is transmitted from a central unit of the base station.

Example 44: The method of any of examples 21 through 43, wherein the configuration message comprises a type of service with which the quality of experience measurements are associated.

Example 45: The method of any of examples 21 through 44, further comprising: receiving, from the UE, the second report in accordance with the second configuration, wherein the intended recipient of the second report is the quality of experience server; and relaying the second report to the quality of experience server.

Example 46: An apparatus comprising at least one means for performing a method of any of examples 21 to 45.

Example 47: An apparatus for wireless communications comprising a processor; memory coupled with the processor; and instructions stored in the memory and executable by the processor to cause the apparatus to perform a method of any of examples 21 to 45.

Example 48: A non-transitory computer-readable medium storing code for wireless communications, the code comprising instructions executable by a processor to perform a method of any of examples 21 to 45.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a configuration message that includes a first configuration for reporting quality of experience measurements to a base station and a second configuration for reporting quality of experience measurements to a quality of experience server;
    measuring one or more quality of experience metrics in accordance with the configuration message;
    generating a first report for the base station based at least in part on the quality of experience measurements and the first configuration; and
    transmitting the first report to a central unit of the base station in accordance with the first configuration, the first report comprising a set of quality of experience metrics that are formatted to be readable by the base station, wherein the set of quality of experience metrics comprises a delay satisfaction level metric indicating a level of satisfaction associated with a delay experienced in communications pertaining to a service provided to the UE via the base station.

2. The method of claim 1, wherein:
    the base station comprises the central unit and one or more distributed units.

3. The method of claim 1, wherein transmitting the first report to the central unit of the base station comprises:
    transmitting the first report via an applications layer report in accordance with the first configuration.

4. The method of claim 1, wherein transmitting the set of quality of experience metrics comprises:
    transmitting an overall quality of experience satisfaction level metric as one of the set of quality of experience metrics, the overall quality of experience satisfaction level metric indicating a level of satisfaction associated with a service provided to the UE via the base station.

5. The method of claim 1, wherein transmitting the set of quality of experience metrics comprises:
    transmitting a bitrate satisfaction level metric as one of the set of quality of experience metrics, the bitrate satisfaction level indicating a level of satisfaction associated with a bitrate used for communications pertaining to a service provided to the UE via the base station.

6. The method of claim 1, wherein transmitting the set of quality of experience metrics comprises:
    transmitting an error rate satisfaction level metric as one of the set of quality of experience metrics, the error rate satisfaction level indicating a level of satisfaction associated with a packet error rate used for communications pertaining to a service provided to the UE via the base station.

7. The method of claim 1, wherein transmitting the set of quality of experience metrics comprises:
    transmitting, as one of the set of quality of experience metrics, an indication of an average throughput associated with communications pertaining to a service provided to the UE via the base station, an indication of a retransmission probability for the communications pertaining to the service, a standard deviation associated with the communications pertaining to the service, or a combination thereof.

8. The method of claim 1, wherein transmitting the set of quality of experience metrics comprises:
    transmitting, as one of the set of quality of experience metrics, an indication of an average hypertext transmission protocol response time associated with communications pertaining to a service provided to the UE via the base station, a connection setup time for the communications pertaining to the service, or a combination thereof.

9. The method of claim 1, wherein the first report comprises a type of service provided to the UE via the base station and with which one or more quality of experience measurements are associated.

10. The method of claim 1, further comprising:
    generating a second report for the quality of experience server based at least in part on the quality of experience measurements and the second configuration; and
    transmitting the second report to the quality of experience server via the base station.

11. A method for wireless communications at a base station, comprising:

transmitting, to a user equipment (UE), a configuration message that includes a first configuration for reporting quality of experience measurements to the base station and a second configuration for reporting quality of experience measurements to a quality of experience server;

receiving, at a central unit of the base station, a first report from the UE in accordance with the first configuration, the first report comprising a set of quality of experience metrics and a set of quality of experience measurements wherein the set of quality of experience metrics are formatted to be readable by the base station, wherein the set of quality of experience metrics comprises a delay satisfaction level metric indicating a level of satisfaction associated with a delay experienced in communications pertaining to a service provided to the UE via the base station;

transmitting, to a distributed unit of the base station, a second report comprising at least a portion of the set of quality of experience measurements included in the first report; and determining, based at least in part on the set of quality of experience measurements included in the first report, whether to adjust one or more parameters for communicating with the UE in association with a service provided to the UE, wherein the set of quality of experience measurements relate to the service.

12. The method of claim 11, wherein receiving the first report at the central unit of the base station comprises:
receiving the first report via an applications layer report in accordance with the first configuration.

13. The method of claim 11, wherein the second report comprises the set of quality of experience metrics that are formatted to be readable by the base station and a type of service provided to the UE via the base station and with which the set of quality of experience measurements are associated.

14. The method of claim 13, wherein the central unit of the base station transmits the second report to the distributed unit of the base station via an F1 application protocol interface or via a UE Context Setup or Modification procedure.

15. The method of claim 11, wherein receiving the set of quality of experience metrics comprises:
receiving an overall quality of experience satisfaction level metric as one of the set of quality of experience metrics, the overall quality of experience satisfaction level metric indicating a level of satisfaction associated with the service provided to the UE via the base station.

16. The method of claim 11, wherein receiving the set of quality of experience metrics comprises:
receiving a bitrate satisfaction level metric as one of the set of quality of experience metrics, the bitrate satisfaction level metric indicating a level of satisfaction associated with a bitrate used for communications pertaining to the service provided to the UE via the base station.

17. The method of claim 11, wherein receiving the set of quality of experience metrics comprises:
receiving an error rate satisfaction level metric as one of the set of quality of experience metrics, the error rate satisfaction level metric indicating a level of satisfaction associated with a packet error rate used for communications pertaining to the service provided to the UE via the base station.

18. The method of claim 11, wherein receiving the set of quality of experience metrics comprises:
receiving, as one of the set of quality of experience metrics, an indication of an average throughput associated with communications pertaining to the service provided to the UE via the base station, an indication of a retransmission probability for the communications pertaining to the service, a standard deviation associated with the communications pertaining to the service, or a combination thereof.

19. The method of claim 11, wherein receiving the set of quality of experience metrics comprises:
receiving, as one of the set of quality of experience metrics, an indication of an average hypertext transmission protocol response time associated with communications pertaining to the service provided to the UE via the base station, a connection setup time for the communications pertaining to the service, or a combination thereof.

20. The method of claim 11, further comprising:
receiving, from the UE, a third report in accordance with the second configuration, wherein an intended recipient of the third report is the quality of experience server; and
relaying the third report to the quality of experience server.

21. An apparatus for wireless communications, comprising:
a processor,
memory coupled with the processor; and
instructions stored in the memory and executable by the processor to cause the apparatus to:
receive a configuration message that includes a first configuration for reporting quality of experience measurements to a base station and a second configuration for reporting quality of experience measurements to a quality of experience server;
measure one or more quality of experience metrics in accordance with the configuration message;
generate a first report for the base station based at least in part on the quality of experience measurements and the first configuration; and
transmit the first report to a central unit of the base station in accordance with the first configuration, the first report comprising a set of quality of experience metrics that are formatted to be readable by the base station, wherein the set of quality of experience metrics comprises a delay satisfaction level metric indicating a level of satisfaction associated with a delay experienced in communications pertaining to a service provided to the UE via the base station.

22. The apparatus of claim 21, wherein the base station comprises the central unit and one or more distributed units.

23. The apparatus of claim 21, wherein the instructions stored in the memory and executable by the processor further cause the apparatus to:
transmit the first report via an applications layer report in accordance with the first configuration.

24. The apparatus of claim 21, wherein the instructions stored in the memory and executable by the processor further cause the apparatus to:
transmit an overall quality of experience satisfaction level metric as one of the set of quality of experience metrics, the overall quality of experience satisfaction level metric indicating a level of satisfaction associated with a service provided to a UE via the base station.

25. The apparatus of claim 21, wherein the instructions stored in the memory and executable by the processor further cause the apparatus to:

transmit a bitrate satisfaction level metric as one of the set of quality of experience metrics, the bitrate satisfaction level indicating a level of satisfaction associated with a bitrate used for communications pertaining to a service provided to a UE via the base station.

26. The apparatus of claim 21, wherein the instructions stored in the memory and executable by the processor further cause the apparatus to:

transmit an error rate satisfaction level metric as one of the set of quality of experience metrics, the error rate satisfaction level indicating a level of satisfaction associated with a packet error rate used for communications pertaining to a service provided to a UE via the base station.

27. An apparatus for wireless communications, comprising:

a processor;

memory coupled with the processor; and instructions stored in the memory and executable by the processor to cause the apparatus to:

transmit, to a user equipment (UE), a configuration message that includes a first configuration for reporting quality of experience measurements to a base station and a second configuration for reporting quality of experience measurements to a quality of experience server, the base station comprising a central unit and one or more distributed units;

receive, at the central unit of the base station, a first report from the UE in accordance with the first configuration, the first report comprising a set of quality of experience metrics and a set of quality of experience measurements, wherein the set of quality of experience metrics are formatted to be readable by the base station, and wherein the set of quality of experience metrics comprises a delay satisfaction level metric indicating a level of satisfaction associated with a delay experienced in communications pertaining to a service provided to the UE via the base station;

transmit, to a distributed unit of the base station, a second report comprising at least a portion of the set of quality of experience metrics included in the first report; and determine, based at least in part on the set of quality of experience measurements included in the first report, whether to adjust one or more parameters for communicating with the UE in association with a service provided to the UE, wherein the set of quality of experience measurements relate to the service.

* * * * *